(12) United States Patent
Stefik et al.

(10) Patent No.: US 10,954,393 B2
(45) Date of Patent: Mar. 23, 2021

(54) TUNABLE NANOMATERIALS BY TEMPLATING FROM KINETICALLY TRAPPED POLYMER MICELLES

(71) Applicant: University of South Carolina, Columbia, SC (US)

(72) Inventors: Morgan Stefik, Columbia, SC (US); Hasala N. Lokupitiya, Columbia, SC (US)

(73) Assignee: University of South Carolina, Columbia, SC (US)

( * ) Notice: Subject to any disclaimer, the term of this patent is extended or adjusted under 35 U.S.C. 154(b) by 35 days.

(21) Appl. No.: 15/596,095

(22) Filed: May 16, 2017

(65) Prior Publication Data

US 2017/0335112 A1 Nov. 23, 2017

Related U.S. Application Data

(60) Provisional application No. 62/337,381, filed on May 17, 2016.

(51) Int. Cl.

| C09D 1/00 | (2006.01) |
|---|---|
| C01G 41/02 | (2006.01) |
| C01B 33/12 | (2006.01) |
| C01G 33/00 | (2006.01) |
| C08G 65/332 | (2006.01) |
| C08L 71/02 | (2006.01) |
| C08F 293/00 | (2006.01) |

(52) U.S. Cl.
CPC .............. *C09D 1/00* (2013.01); *C01B 33/126* (2013.01); *C01G 33/00* (2013.01); *C01G 41/02* (2013.01); *C08F 293/005* (2013.01); *C08L 71/02* (2013.01); *C08F 2438/01* (2013.01)

(58) Field of Classification Search
CPC ...... C01G 33/00; C01G 41/02; C08G 65/332; C08G 2650/02; C01B 33/126; C08L 71/02
See application file for complete search history.

(56) References Cited

U.S. PATENT DOCUMENTS

| 5,958,369 A * | 9/1999 | Kosuge ................. C01B 37/005 423/326 |
|---|---|---|
| 2004/0234439 A1* | 11/2004 | Takeshima ......... B01D 53/9445 423/263 |
| 2009/0031536 A1* | 2/2009 | Takeshima ........... B01J 35/0013 23/313 R |
| 2011/0318249 A1* | 12/2011 | Nakayama .......... H01M 14/005 423/325 |
| 2012/0263938 A1* | 10/2012 | Paul .................... C23C 18/1216 428/312.8 |

(Continued)

FOREIGN PATENT DOCUMENTS

| CN | 101343065 A * | 1/2009 | |
|---|---|---|---|
| EP | 2268758 B1 * | 12/2013 | ................ C08F 2/38 |

OTHER PUBLICATIONS

Machine translation of Yu (CN101343065A), publication date Jan. 14, 2009.*

(Continued)

*Primary Examiner* — Jun Li
(74) *Attorney, Agent, or Firm* — Burr & Forman LLP; Douglas L. Lineberry

(57) ABSTRACT

Products derived from and methods of micelle templating that allow for orthogonal control over structural features.

9 Claims, 28 Drawing Sheets

(56) References Cited

U.S. PATENT DOCUMENTS

2016/0089334 A1* 3/2016 Nakayama ............. C09D 11/00
424/489

OTHER PUBLICATIONS

Mahajan (Synthesis and Characterization of Amphiphilic Poly(ethylene oxide)-block-poly(hexyl methylacrylate) Copolymers, Macromol. Chem. Phys. (2003), 204, 1047-1055).*

Lokupitiya (Ordered Mesoporous to Macroporous Oxides with Tunable Isomorphic Architectures: Solution Criteria for Persistent Micelle Templates, Chemistry of Materials (2016): 28 p. 1653-1667).*

Renker (Nanostructure and Shape Control in Polymer-Ceramic Hybrids from Polyethylene oxide)-block-poly(hexyl methylacrylate) Copolymers and Aluminosilicates Derived from Them, Macromol. Chem. Phys. (2004), 205, 1021-1030).*

Polymerization of Ethylene Oxide, Propylene Oxide and Other Alkylene Oxides: Synthesis, Novle Polymer Architectures and Bioconjugation, Cehm. Rev. 2016, 116, 2170-2243.*

* cited by examiner

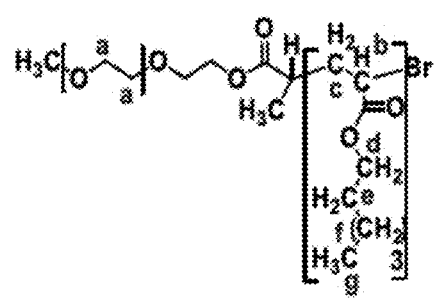
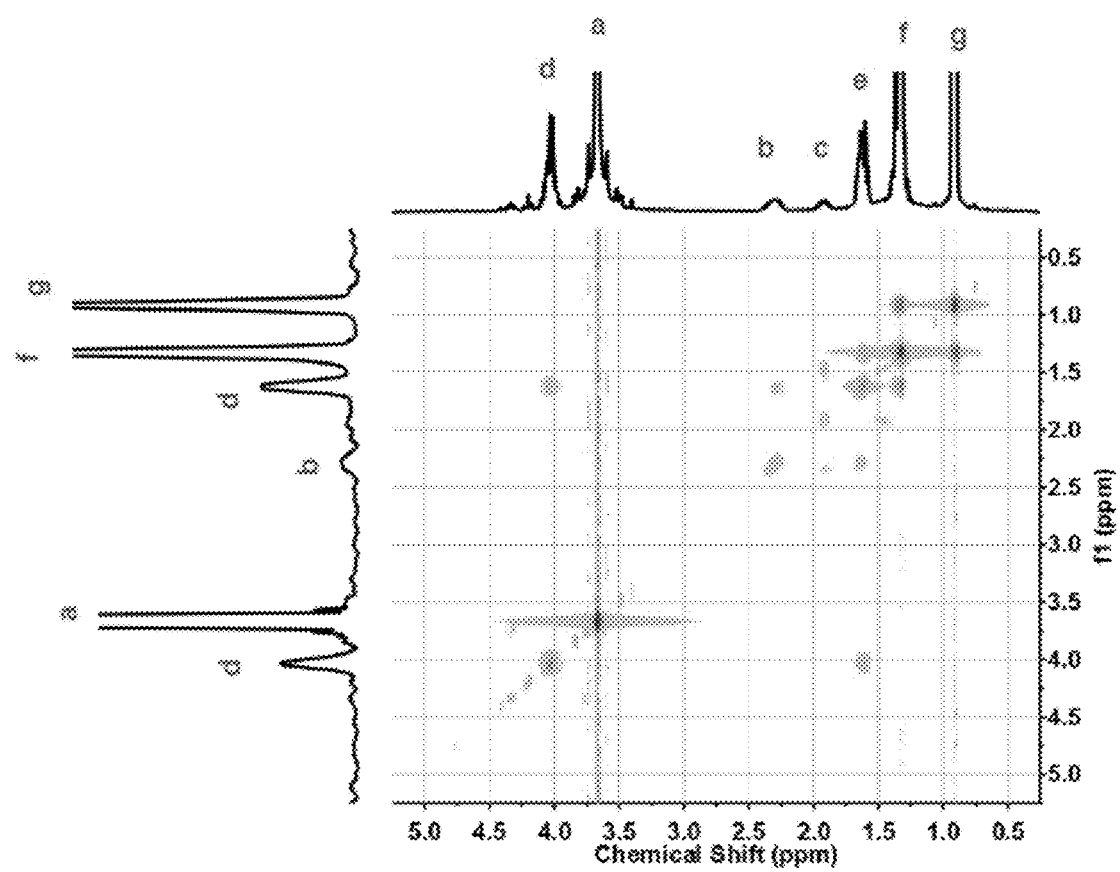
FIGURE 4

Table 3. Synthesis Quantities for Mesoporous Nb$_2$O$_5$ with Varying I:O Ratios

| sample name | I:O ratio[a] | Nb(OEt)$_5$ (mL) | THF (mL) | polymer (mg) | HCl (mL) | polymer wt % |
|---|---|---|---|---|---|---|
| 1.2-Nb$_2$O$_5$ | 1.2 | 0.051 | 2.0 | 22.4 | 0.1 | 1.18 |
| 2.4-Nb$_2$O$_5$ | 2.4 | 0.102 | 2.0 | 22.4 | 0.1 | 1.09 |
| 3.0-Nb$_2$O$_5$ | 3.0 | 0.128 | 2.0 | 22.4 | 0.1 | 1.08 |
| 2.4-3.0-Nb$_2$O$_5$ | 3.0 | 0.128 | 2.0 | 22.4 | 0.106 | 1.07 |

[a] I:O ratio is the Nb$_2$O$_5$ oxide-to-polymer mass ratio in the final hybrid material assuming complete conversion of oxide precursors.

FIGURE 6

Table 2. Average Pore Diameter and Wall-Thickness of Calcined Nb$_2$O$_5$ Thin Films by Varying the L/O Ratio with P3 and P4 Polymers

| sample name | avg. pore diameter from SEM (nm)$^a$ | pore diameter standard deviation (nm) | avg. wall-thickness from SEM (nm)$^a$ | in-plane $d$-spacing from GISAXS (nm) | in-plane lattice parameter from SEM (nm)$^b$ |
|---|---|---|---|---|---|
| *BCC Micelle Morphology* | | | | | |
| P4-1.2-Nb$_2$O$_5$ | 24.9 ± 0.6 | 2.7 | 10.6 ± 0.5 | 28.9 | 33.3–35.3 |
| P3-2.4-Nb$_2$O$_5$ | 24.6 ± 0.8 | 3.8 | 18.2 ± 0.8 | 40.3 | 41.2–43.4 |
| P3-3.6-Nb$_2$O$_5$ | 18.8 ± 0.5 | 3.7 | 22.8 ± 2.3 | 45.4 | 39.60–48.5 |
| P3-2.4→3.0-Nb$_2$O$_5$ | 24.4 ± 0.7 | 3.8 | 23.8 ± 0.8 | 45.3 | 44.3–54.3 |
| *Disordered Micelle Morphology* | | | | | |
| P4-1.2-Nb$_2$O$_5$ | 37.0 ± 2.3 | 11.3 | 13.1 ± 0.8 | 66.0$^c$ | no peak was observed |
| P4-2.4-Nb$_2$O$_5$ | 33.3 ± 1.3 | 11.8 | 30.3 ± 0.9 | 68.0$^c$ | |
| P4-3.6-Nb$_2$O$_5$ | 30.1 ± 3.3 | 14.5 | 35.7 ± 3.8 | | |

$^a$ Where the average is reported ± the error of the mean. $^b$ in-plane lattice parameter $a = \frac{4\pi\sqrt{2}}{q_{max}\sqrt{3}}$ after fitting an ellipse to the scattering pattern.

$^c$ Where $d = \frac{2\pi}{q}$ from the first scattering peak for disordered micelles.

Table 4. Solution Composition and Hildebrand Parameters of the P3 Films during the Processing Steps

| sample name | initial water vol % | expected final water vol % | δ THF+HCl | δ after hydrolysis |
|---|---|---|---|---|
| P3-1.2-$Nb_2O_5$ | 3.60 | 2.73 | 19.65 | 19.53 |
| P3-2.4-$Nb_2O_5$ | 3.60 | 1.86 | 19.65 | 19.41 |
| P3-3.0-$Nb_2O_5$ | 3.60 | 1.43 | 19.65 | 19.34 |
| P3-2.4–3.0-$Nb_2O_5$[a] | 3.82 | 1.64 | 19.65 | 19.41 |

[a] Starting from I:O 2.4 conditions, the solution δ was increased by adding more HCl to allow for a further addition of niobium ethoxide to reach an I:O ratio of 3.0.

FIGURE 17

Table 5. Characterization of Different Mesoporous Inorganic Systems after Calcination

| inorganic system | average pore diameter from SEM (nm)[a] | pore diameter standard deviation (nm) | average wall thickness from SEM (nm)[a] | GISAXS d-spacing (nm)[b] |
|---|---|---|---|---|
| $WO_3$ | 35.0 ± 1.4 | 6.0 | 26.2 ± 1.1 | 51.1 |
| $SiO_2$ | 75.2 ± 2.9 | 13.0 | 16.3 ± 0.6 | no peaks |

[a]Where the average is reported ± the error of the mean. [b]$d = \frac{2\pi}{q}$, where the first scattering peak is for the disordered micelles.

FIGURE 25

Table 6. Parameters Correlated to the Final Pore Size for Micelle Scaling Relationships

| sample name | $N_{PHA}$ | $\chi_{isophase-solvent}$ | pore diameter (nm) |
|---|---|---|---|
| P2-$Nb_2O_5$ | 116.0 | 0.46 | 19.5 |
| P3-1.2-$Nb_2O_5$-5 min vortex | 278.8 | 0.56 | 24.9 |
| P3-2.4-$Nb_2O_5$-5 min vortex | 278.8 | 0.63 | 26.6 |
| P3-3.0-$Nb_2O_5$-5 min vortex | 278.8 | 0.71 | 28.9 |
| P3-1.2-$Nb_2O_5$-60 min vortex | 278.8 | 0.56 | 25.3 |
| P3-2.4-$Nb_2O_5$-60 min vortex | 278.8 | 0.63 | 28.9 |
| P3-3.0-$Nb_2O_5$-60 min vortex | 278.8 | 0.71 | 32.1 |
| P4-$WO_3$ | 431.4 | 0.52 | 35.0 |
| P4-$Nb_2O_5$ | 431.4 | 0.56 | 57.0 |
| P4-$SiO_2$ | 431.4 | 0.68 | 75.2 |

FIGURE 28

TUNABLE NANOMATERIALS BY TEMPLATING FROM KINETICALLY TRAPPED POLYMER MICELLES

BACKGROUND OF THE INVENTION

1) Field of the Invention

The present invention relates to products derived from and methods of micelle templating that allow for orthogonal control over structural features.

2) Description of Related Art

Porous and nanoscale architectures of inorganic materials have become crucial for a range of energy and catalysis applications, where the ability to control the morphology largely determines the transport characteristics and device performance. Despite the availability of a range of block copolymer self-assembly methods, the conditions for tuning the key architectural features, such as the inorganic wall-thickness, have remained elusive.

Crystalline transition metal oxides with nanoscale porous structures are in high demand for energy and catalytic applications that take advantage of their high surface area and interconnected structures. For example, electrochemical devices such as dye-sensitized solar cells, mesoscopic perovskite solar cells, batteries, supercapacitors, fuel cells, and photoelectrochemical devices for solar fuels all take advantage of access to crystalline metal oxides with interconnected mesopores.

The improvement of such devices relies upon judicious optimization of the nanoscale morphology to match the transport limitations of the inorganic materials. Furthermore, many device designs rely on subsequent material deposition by atomic layer deposition or electrodeposition, for example, and will benefit from architectures that are continuously variable beyond the typical 10-30 nm feature sizes from block copolymers up toward larger 100 nm feature sizes more commonly found from colloidal template techniques.

The extension of block copolymer coassembly continuously from the mesoporous regime into the macroporous regime opens new opportunities for ideal comparative studies that use a single synthesis method. In particular, the inorganic wall-thickness plays a crucial role on device performance where both ion diffusion into the electrode and electron transport along the electrode depend on morphology. Additionally, the wall-thickness affects the overall mass of active material in a given volume and thus influences the energy density of energy storage devices.

Structure-directing agents (SDA) enable the evaporation induced coassembly of nanostructured inorganic materials. The field has continuously evolved over the past two decades where typical SDAs are amphiphilic molecules having a hydrophilic portion and a hydrophobic portion covalently bound together. Generally, the hydrophilic portion selectively interacts with hydrophilic inorganic species via electrostatic or hydrogen bonding, while the hydrophobic portion phase separates with nanoscale periodicity. Surfactant molecules were the first used SDAs where the nominal pore diameter was initially restricted to 1-5 nm and was later expanded with swelling agents.

The introduction of amphiphilic block copolymer SDAs with significantly higher molar mass expanded the accessible mesopore sizes to 5-30 nm. The resulting structural dimensions are dictated by the polymer chain dimensions and are conceptually distinct from vesicle templating. A range of BCP SDAs have been elaborated including poly (ethylene oxide-b-propylene oxide-b-ethylene oxide), poly (isoprene-b-ethylene oxide), poly(styrene-b-ethylene oxide), poly-(ethylene oxide-b-acrylonitrile), poly(methyl methacrylate-b-ethylene oxide), poly(isobutylene-b-ethylene oxide), poly(ethylene-alt-propylene-b-ethylene oxide), and poly(isoprene-b-styrene-b-ethylene oxide), for nanostructured silicates and transition metal oxides.

Access to continuously tunable isomorphic architectures is crucial in establishing property-performance relationships for novel nanostructured materials. A predictive self-assembly methodology is needed to provide for such nuanced structural control. The approaches used with the numerous BCP SDAs mentioned above resulted in either mesoporous materials alone or macroporous materials from vesicles where neither strategy has yet enabled continuous tuning of pore sizes across these regimes.

What is needed in the art is a method of micelle templating that allows for orthogonal control over features. Coassembly with nondynamic micelles is expected over limited experimental conditions where predictive processing guidelines are needed to enable widespread development spanning the gamut from mesopores to macropores. Furthermore, adjusting the amount of inorganic material in equilibrating systems results in significant morphology changes with different symmetry and changing connectivity that alone may lead to performance changes.

SUMMARY OF THE INVENTION

The current disclosure provides, in one embodiment, a method for fabricating tunable nanomaterials. The method comprises tuning micelle pore size, impeding micelle equilibration during coassembly via kinetically entrapping the micelle, controlling spacing between the micelle and micelle wall thickness without changing micelle pore size, and obtaining persistent micelle pore size via coassembly control with independently tunable micelle wall thickness. Further, the method produces isomorphic nanostructures with tunable wall thickness. Still further, the micelle pore sizes created may range from mesopores to macropores. Yet further, the micelle pore sizes range from 20 to 75 nm.

The method further includes a structure-directing agent with a high Flory-Huggins effective interaction parameter where the structure-directing agent is employed to cause kinetic entrapment of the micelles. Further, the structure-directing agent comprises poly(ethylene oxide-b-hexyl acrylate) (PEO-b-PHA). Yet further, the PEO and PHA blocks of the structure directing agent each have a glass transition temperature at or below −56° C. Even further, micelle core radius and resulting micelle pore diameter should scale linearly with $(X^{9/11}N_{PHA}^{2}N_{PEO}^{-18/11})^{1/3}$. Further still, the tunable nanomaterials are stable to high temperatures and enable the formation of multiple crystalline oxide frameworks. Further, the micelle may be incorporated into a film.

In a further embodiment, a design strategy for constructing mesopores and macropores is provided. The strategy includes contrasting solvophobe to solution, employing a structure directing agent, tuning inorganic to organic ratios to determine inorganic wall thickness, maintaining micelle nonergodicity after addition of an inorganic precursor, and maintaining all species in solution throughout the process. Further, the design strategy produces isomorphic nanostructures with tunable wall thickness. Still further, the micelle pore sizes created may range from mesopores to macropores. Yet further, the micelle pore sizes range from 20 to 75 nm. Still further, the design strategy may include a structure-directing agent having a high Flory-Huggins effective interaction parameter is employed to cause kinetic entrapment of the micelles. Further yet, the structure-directing agent comprises poly(ethylene oxide-b-hexyl acrylate) (PEO-b-PHA). Even further, the PEO and PHA blocks of the structure directing agent each have a glass transition temperature at or below −56° C.

Further, the design strategy provides that core radius and pore diameter should scale linearly with $(X^{9/11}N_{PHA}{}^2N_{PEO}{}^{-18/11})^{1/3}$. Still further, the tunable nanomaterials are stable to high temperatures and enable the formation of multiple crystalline oxide frameworks. Furthermore, the micelles may be incorporated into a film.

In a further embodiment, a structure directing agent for use with forming persistent micelle templating of isomorphic nanostructures is provided. The structure directing agent comprises an amphiphilic block copolymer. Further, the structure directing agent having a glass transition temperature below −56° C. Even further, the structure-directing agent has a high Flory-Huggins effective interaction parameter. Still further, the structure-directing agent comprises poly(ethylene oxide-b-hexyl acrylate) (PEO-b-PHA).

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 4 shows $^1H$-$^1H$ correlation spectroscopy (COSY).

FIG. 6 shows synthesis quantities for mesoporous $Nb_2O_5$ with varying I:O ratios.

FIG. 15 shows Table 2 that displays Average Pore Diameter and Wall Thickness of Calcined $Nb_2O_5$ Thin Films by Varying the I:O Ratio with P3 and P4 Polymers.

FIG. 16 shows Table 3: Synthesis Quantities for Mesoporous $Nb_2O_5$ with Varying I:O Ratios.

FIG. 17 shows Table 4: Solution Composition and Hildebrand Parameters of the P3 Films Processing steps.

FIG. 25 shows characterization of different mesoporous inorganic systems after calcination.

FIG. 28 shows Table 6—Parameters Correlated to the Final Pore Size for Micelle Scaling Relationships.

Figure 1:
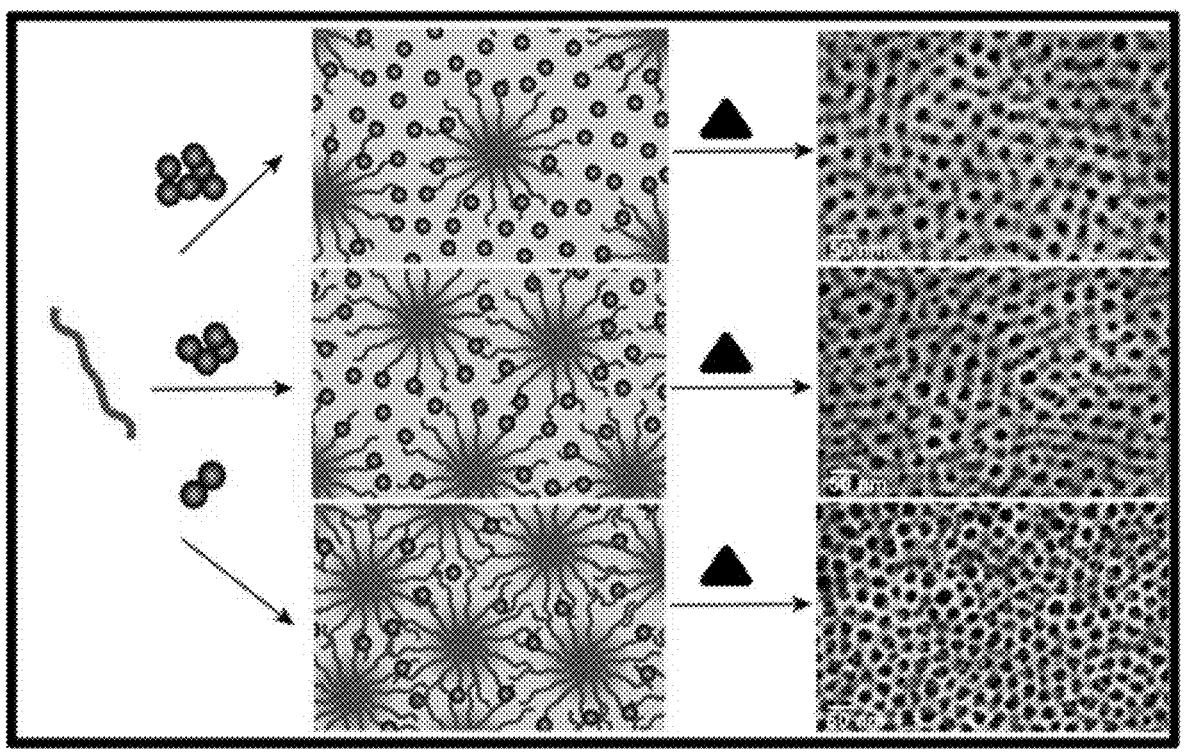
FIG. 1 shows an illustrative process of micelle coassembly and electron microscopy images of resulting porous structures.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The current disclosure is directed to kinetic entrapment of block copolymer micelles to fabricate tunable nanomaterials with adjustable pore size and wall thickness. The use of kinetically trapped micelles allows: 1) the tuning of the micelle size followed by kinetic entrapment; and 2) the spacing between micelles and the resulting wall thickness.

Other methods of micelle templating do not allow for orthogonal control over features. For example, changes to the recipe for wall-thickness control generally result in different pore sizes at the same time. The method of the current disclosure expands upon prior capabilities by the use of kinetic entrapment to prevent micelle templates from responding to changing process conditions.

In one embodiment of the current disclosure, solution processing guidelines have been developed that enable isomorphic nanostructures with tunable wall-thickness. In one embodiment, BCP (block copolymer) solution processing guidelines that enable tunable isomorphic architectures with adjustable inorganic wall-thickness are provided. The current process may also be used for production of organic materials, such as porous carbon as well as used to optimize and preserve micelle sizes for organic drug delivery. This approach enables concomitant access to extensive pore size regimes that seamlessly span from mesopores to macropores. A new poly(ethylene oxide-b-hexyl acrylate) (PEO-b-PHA) structure-directing agent (SDA) was used to demonstrate the key solution design criteria. Specifically, the use of a polymer with a high Flory-Huggins effective interaction parameter (X) ranging from 0.25-0.35, and appropriate solution conditions that significantly hinder the exchange of polymer chains between micelles. This leads to the kinetic entrapment of persistent micelle templates (PMT) for tunable isomorphic architectures. The use of a polymer with sufficiently high Flory-Huggins interaction parameter is needed to inhibit micelle re-equilibration that would otherwise change the final pore size with different inorganic loadings. Both micelle fusion-fission and unimer expulsion-insertion reactions may be slowed with appropriate solution conditions that inhibit micelle changes. Solubility parameters are used to predict conditions for maintaining persistent micelle sizes despite changing equilibrium conditions. For the current disclosure, the use of different inorganic loadings controls the inorganic wall thickness with constant pore size. This versatile method enabled a record 55 nm oxide wall-thickness from micelle coassembly as well as the seamless transition from mesoporous materials to macroporous materials by varying the polymer molar mass and solution conditions. In one embodiment, wall thickness may determine the performance of a device made from the porous materials described herein. Indeed, thicker walls may lead to the formation of high energy dense materials. The processing guidelines are generalizable and were elaborated with three inorganic systems, including $Nb_2O_5$, $WO_3$, and $SiO_2$, that were thermally stable to 600° C. for access to crystalline materials. FIG. 1 shows an illustrative process of micelle coassembly and electron microscopy images of resulting porous structures.

Experimental Methods. Reagents. Anhydrous, inhibitor free THF (>99.9%, Aldrich), niobium(V) ethoxide (99.9%, Fisher), and tungsten(VI) chloride (99.9%, Acros) were stored inside a glovebox and used as received. Concentrated hydrochloric acid (37 wt % ACS grade, VWR) and tetra-ethoxysilane (98%, Alfa Aesar) were used as received. Poly-(ethylene glycol) methyl ether (Mn 20 000 g $mol^{-1}$, Aldrich) was dried by azeotropic distillation with toluene before use.

Figure 2:
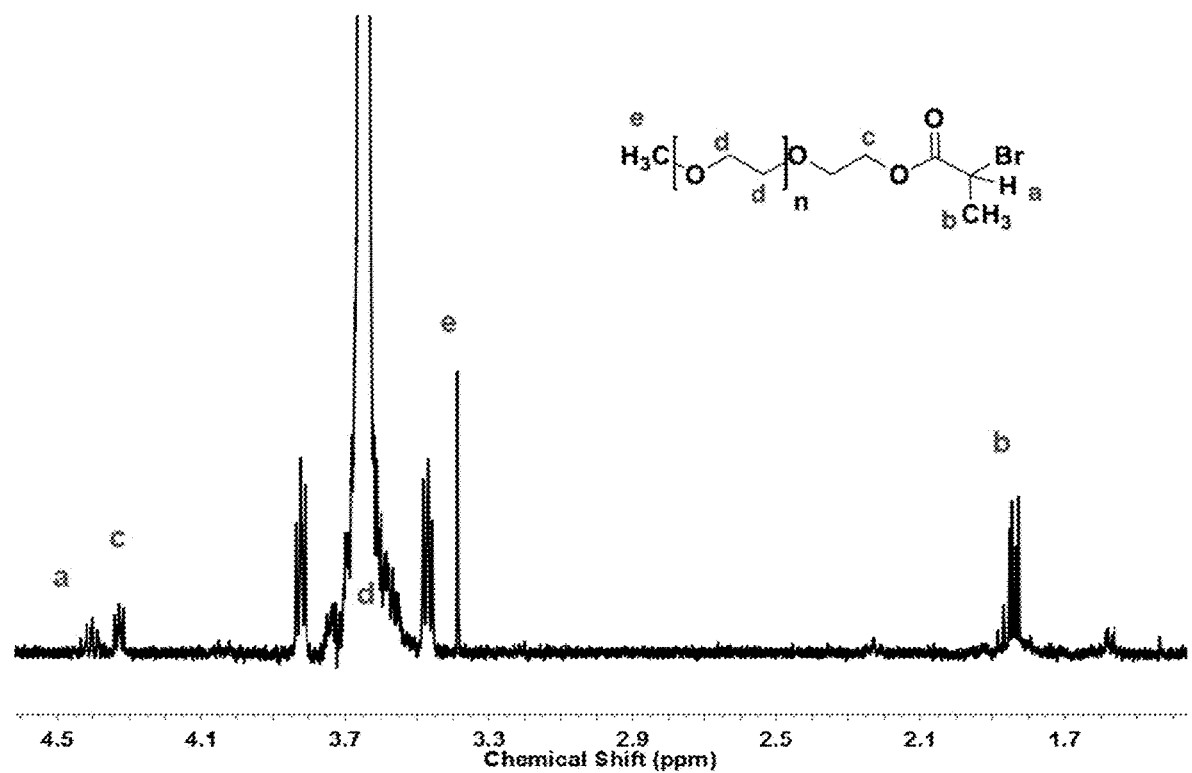
FIG. 2 illustrates an NMR spectroscopy image of the quantitative reaction of the hydroxyl group of the poly(ethylene glycol)methyl ether.

PEO-Br Macroinitiator Synthesis. PEO-Br was prepared by an esterification procedure. In a typical experiment, 10 g of PEO-OH was dissolved in 33 mL of methanol-free methylene chloride, and 0.054 mL of 2-bromopropionic acid was added with nitrogen flow at room temperature. The mixture was then cooled to 0° C. before the addition of 0.0244 g of 4-(dimethylamino)pyridine and 0.1238 g of N,N'-dicyclohexylcarbodiimide (PEO:2-bromopropionic acid:4-(dimethylamino)pyridine:N,N'-dicyclohexylcarbodiimide=1:1.2:0.4:1.2). The reaction was stirred overnight at room temperature. The precipitated dicyclohexylurea was removed by filtration, and then the methylene chloride was removed by vacuum. The product was next dissolved in THF and precipitated three times into cold diethyl ether (THF:diethyl ether=1:15). The precipitated product was filtered and washed thoroughly with the same solvent and dried at 40° C. for 24 h inside a vacuum oven. The quantitative reaction of the hydroxyl group of the poly (ethylene glycol)methyl ether was determined by $^1H$ NMR spectroscopy. See FIG. 2, $^1H$ NMR for PEO(20 k)-Br macroinitiator. The quantitative esterification reaction of the hydroxyl group of the poly(ethylene glycol)methyl ether was confirmed by comparing peak d to a, b, and c.

PEO-b-PHA Diblock Copolymer Synthesis. The monomer hexyl acrylate was passed through a basic alumina column just prior to use. The poly(hexyl acrylate) block was prepared by atom transfer radical polymerization as follows. First, 0.75 g of PEO-Br macroinitiator was dissolved in 0.85 mL of DMF inside a Schlenk flask and stirred until it dissolved. Moderate heat of ~40° C. was used to promote dissolution. Next, 4.26 mL of hexyl acrylate and 10.4 µL of HMTETA were added to the above mixture. After 10 min of stirring, the solution was subjected to three freeze-pump-thaw (FPT) cycles. At the last step, the flask was kept frozen, and 5.4 mg of Cu(I)Br was added under flowing nitrogen. The flask then was sealed under flowing nitrogen, and another FPT cycle was carried out. The flask was subsequently kept at room temperature until the mixture was thawed. It then was kept in a preheated oil bath at 70° C. with constant stirring. After 17.5 h, the polymerization was stopped by cooling the reaction mixture with ice water before exposing the catalyst to air. The crude polymerization solution was diluted with THF, and the solution was passed through a basic alumina column to remove CuBr. The filtrate was concentrated via vacuum and precipitated two times into cold methanol (−78° C.). The product was filtered and vacuum-dried at 40° C. for 24 h. The molar mass of PHA was determined by $^1$H NMR relative to the PEO macroinitiator, and gel permeation chromatography (GPC) was used to obtain the molar mass dispersity. See FIG. 3, controlled growth of PEO-b-PHA as confirmed using (a) 1H NMR to calculate block ratios. The multiplet at 1.8 ppm was assigned to protons labeled as c in the structure which showed only 25% from the expected integration. However, due to tacticity, there are multiple resonances (4) between 1.2-1.9 ppm. These can be seen with both the 1H-1H COSY, see FIG. 4, and 1H {13C} HSQC, see FIG. 5, spectra. These resonances are mostly overlapped with e and f in the $^1$H NMR and are included in the total area calculation used to calculate the molar mass of PHA. (b) GPC traces to check the molar mass dispersity at each synthesis step.

Synthesis of Different Mesoporous Metal Oxides Thin Films. $Nb_2O_5$ Wall-Thickness Tuning. PEO-b-PHA (22.4 mg) block copolymer was dissolved in 2.0 mL of anhydrous inhibitor-free THF with continuous stirring for 1 h. The polymer solution was heated to 40° C. at the beginning to completely dissolve the polymer. Next, 100 μL of 37% w/w conc. HCl was added very slowly to the polymer solution while stirring. The solution was subsequently vortexed for 5 min at 2000 rpm followed by the desired amount of niobium ethoxide as tabulated in Table 3, see FIG. 6. Sample P3-2.4-3.0-$Nb_2O_5$ was prepared similarly to P3-2.4-$Nb_2O_5$ but had additional acid added after adjusting the I:O ratio to 2.4. Subsequently, 26 μL of additional niobium ethoxide was added to increase the I:O ratio to 3.0. The resulting solutions were slowly shaken for 1 h before casting. The solution was dip coated onto a plasma cleaned 0.25 mm×0.8 mm silicon wafer at a 4.4 mm s$^{-1}$ constant withdrawal rate inside a 20-25% humidity chamber at 25° C. The humidity chamber used in this study was homemade with adjustable purge gas to regulate humidity. Water-saturated air was achieved by passing dry air through a submerged aquarium stone. The purge gas humidity was adjusted by the ratio of dry air to humid air, and monitored by a hygrometer. The resulting thin films were placed on a hot plate at 60° C. for 2 h and heated to 100° C. overnight to promote condensation. The plasma cleaner used in this study was Fisher model 1020, and the plasma was generated with a mixture of 24.6% $O_2$ balanced Ar. Finally, the samples were calcined in air with 10° C./min ramp and 1 min hold at 600° C. followed by natural cooling.

$WO_3$. PEO-b-PHA (50 mg) block copolymer was dissolved in 2.8 mL of anhydrous inhibitor-free THF with continuous stirring for 1 h. The polymer solution was heated to 40° C. at the beginning to completely dissolve the polymer. Next, 0.125 mL of 37% w/w conc. hydrochloric acid was added very slowly to the polymer solution under continuous stirring. The solution was stirred for 1 h before 0.13 g of $WCl_6$ was added to the solution. The same dipping, aging, and calcining procedures described above then were used.

$SiO_2$. PEO-b-PHA (100 mg) block copolymer was dissolved in 1.54 mL of anhydrous inhibitor-free THF. In a separate vial, 0.252 g of tetraethyl orthosilicate (TEOS), 0.12 g of 0.5 M HCl, and 0.847 mL of anhydrous inhibitor-free THF were mixed together. These two solutions were continuously stirred for 1 h at 60° C. and cooled to room temperature before combining the two solutions. The combined solution was then stirred for 2 h at room temperature before dip coating, aging, and calcining was carried out as described above.

Characterization. FE-SEM. Morphologies of the mesoporous thin films were observed with a Zeiss Ultraplus thermal field emission SEM using an acceleration voltage of 5 keV and an in-lens secondary electron detector. The working distance was kept to 3.00 mm or less during the acquisition of the images. Amorphous samples were plasma cleaned prior to imaging, and calcined samples were imaged directly. In both cases, Cu strips were used to improve electrical contact to the sample.

Figure 7:
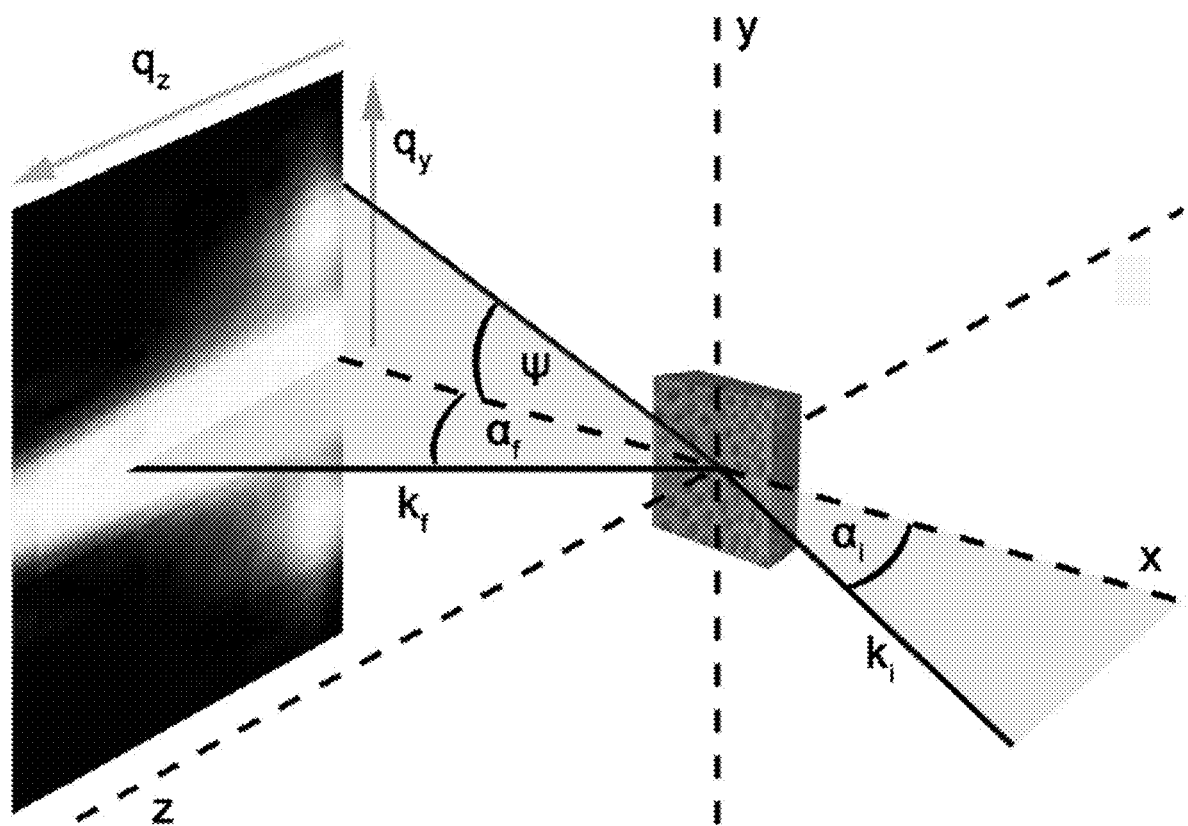
FIG. 7 shows a sketch of the scattering geometry used in GISAXS and GIWAXS.

GISAXS and GIWAXS. X-ray scattering experiments were conducted using a SAXSLab Ganesha at the South Carolina SAXS Collaborative. A Xenocs GeniX3D microfocus source was used with a Cu target to generate a monochromic beam with a 0.154 nm wavelength. The instrument was calibrated using a silver behenate reference with the first order scattering vector q*=1.076 nm$^{-1}$, where q=4π$\lambda^{-1}$ sin θ with a total scattering angle of 2θ. A Pilatus 300 K detector (Dectris) was used to collect the two-dimensional (2D) scattering patterns. Radial integration of 2D WAXS patterns reduced the data to 1D profiles using SAXS GUI software. GISAXS and GIWAXS experiments were conducted with an incident angle near 0.22°, and the samples were rotated relative to the incident beam as shown in FIG. 7. FIG. 7 shows a sketch of the scattering geometry used in GISAXS and GIWAXS. The sample surface was tilted with respect to the incident beam by an incident angle $\alpha_i$. The exit angle is denoted as of and the in-plane angle is Ψ. The sample-to-detector distance of 1050 mm was used for GISAXS, whereas 104.5 mm was used for GIWAXS. The in-plane $q_y$ data were processed using Matlab scripts and the following equation:

$$q_y = \frac{2\pi \cos \alpha_f \sin \Psi}{\lambda}$$

X Measurements Using Temperature-Controlled Stage. The bulk morphology of the polymers was obtained at different temperatures using a Linkam Scientific Instruments HFS350X-GI hot stage. For each experiment, the background scattering from the particular pair of mica sheets used to fix the sample was measured before loading polymer. Polymers were dissolved in THF and filtered through 0.2 μm filter and dried prior to use. The melted polymer (40-50° C.) was placed on a mica sheet (thickness of mica ~20 μm, 34% X-ray transmission from Molmex Scientific Inc.) with a rubber O ring, and the next sheet of mica was placed slowly without trapping any air inside the sandwich.

The prepared sandwich cell was loosely clamped and placed in a vacuum oven for a few minutes before sealing and mounting on the Linkam stage. All data acquired for bulk polymer studies were equilibrated for 1 h and then measured for 1 h at the desired temperatures with an incident X-ray flux of ~1.5 M photons per second on the sample. Matrix-assisted laser desorption ionization time-of-flight MALDI-TOF spectroscopy was used to accurately measure the $M_n$ of the commercial PEO homopolymers. Bruker Ultraflex MALDI-TOF/TOF instrument was used to collect the data nitrogen laser source operating at a wavelength of 337 nm and a pulse rate of 3-5 Hz. The matrix used for the experiment was α-cyano-4-hydroxycinnamic acid. The number-average molar mass was calculated for each sample used for thermodynamic measurements. Each scattering curve was background subtracted to remove the minimal contributions from the mica sample holders. The data were fitted using Matlab to convolve the Leibler random phase approximation with a Gaussian instrumental point spread function. A common reference lattice volume of 0.118 nm$^3$ was used to determine the number of lattice sites occupied by each polymer at each temperature based upon temperature-dependent density data. Similarly, the volume fractions were calculated at each temperature using the same density data. The instrumental broadening was measured as follows.

The beam configuration was adjusted such that the total flux was within the linear intensity regime of the Pilatus detector (~1 M photons/s) and a direct image of the beam was fitted well with a Gaussian profile. An arbitrary silver behenate sample (TCI America) was measured with the same configuration to determine the peak width associated with the sample alone. The same sample was then measured with other brighter beam configurations used on the polymer samples. The different observed widths of the first silver behenate peak were used to calculate the instrumental broadening factors under particular configurations. The polymer SAXS data were collected with a beam configuration corresponding to Gaussian point spread function with a full-width halfmax (FWHM) of 0.0269 nm$^{-1}$. This minor correction had little effect on the interpreted X parameters.

Transmission WAXS for Crystallite Size Analysis. Identical thin film samples were prepared on mica substrates for measurements with a transmission geometry to minimize geometric smearing. The instrumental broadening factor was measured with a WAXS configuration using NIST reference material 640c. The instrumental broadening factor was fit as a Gaussian point spread function with a FWHM 0.0128 nm$^{-1}$ that smeared the NIST instrument-independent FWHM to the FWHM value measured with our WAXS configuration. The same Gaussian point spread function was taken into account to interpret scattering data as a combination of grain-size broadening per the Scherrer formula with the same Gaussian point spread function.

PHA Temperature-Dependent Density Measurement. The density of PHA was determined using water displacement with a pycnometer at different temperatures. Initially, liquid PHA was placed in a preweighed pycnometer, and the mass of PHA was recorded. The container then was filled with deionized, degassed water, and the entire setup was equilibrated at the desired temperature. After equilibration, a capillary stopper was promptly added to displace the excess water and yield a reproducible total system volume. The volume of water was calculated using tabulated temperature-dependent density values and subtracted from baseline measurements to determine the volume of PHA at each temperature. The temperature dependency of the PHA density was found as $\rho PHA=-0.0008T+1.064$, where $\rho$ is the density in g/mL and T is temperature in Celsius. These values were confirmed with a secondary measurement of PHA using helium pycnometer (AccuPyc II 1340) at a fixed temperature and gave a similar value of $1.065\pm0.004$ g cm$^{-3}$ at 22° C.

Estimation of Solubility Parameters. The group contribution method was used to calculate the Hildebrand parameter of hexyl acrylate based on the enthalpy of evaporation of each group. The volume fractions of each component in the solution mixture were used to calculate the Hildebrand parameters of the different solvent mixtures by assuming each component occupies a volume corresponding to their pure densities. Here, values of 18.6, 47.9, and 26 were used for THF, water, and ethanol, respectively.

Derivation of the Relationship between Wall-Thickness and I:O Ratio. The relationship between wall-thickness in the (100) plane and I:O ratio was derived via a BCC micelle model that only considered the micelle core size and the ratio of inorganic content to organic content. The volume occupied by the PEO chains within the inorganic was not taken into account. The density of the amorphous niobia sol was a fit parameter determined using a least-squares optimization. The calculated density for amorphous niobia was 1.88 g/cm$^3$, which is in agreement with prior work that found amorphous sol to have less than one-half the density of the parent crystalline solids.

GPC. Molecular weights and molar mass dispersities were measured using a Polymer Laboratories PL-GPC-120 GPC with a 515 HPLC pump, a 2410 refractive index detector, and three Styragel columns. The columns consisted of HR1, HR3, and HR4, which have the corresponding effective molecular weight ranges of 100-5000, 500-30 000, and 5000-500 000 g mol$^{-1}$, respectively. THF was used as the eluent at a temperature of 30° C. and a flow rate of 1.0 mL min$^{-1}$ with the calibration of polystyrene standards obtained from Polymer Laboratories. GPC samples were prepared by dissolving the sample in THF at a concentration of 2.0 mg/mL and passing through micro filters with an average pore size of 0.2 µm.

Ellipsometry Porosimetry. Ellipsometric Porosimetry (EP) was carried out on a spectroscopic ellipsometer (Semilabs SE-2000) coupled with an Atmospheric Ellipso-Porosimetry module using water as sorbent and nitrogen as carrier gas. The sample was placed in a chamber and the humidity was controlled by two mass flow controllers that regulate the flow of saturated and dry gas. The ellipsometry measurements were carried out at room temperature at an angle of 73°, corresponding to the approximate Brewster angle of the silicon substrate. Data analysis was then carried out with the software of the instrument (Semilabs Spectroscopic Ellipsometry Analyzer). A Tauc-Lorentz dispersion law was applied to the data to obtain values of the refractive index at each humidity point, corresponding to the adsorption of water molecules into the pores. The adsorption-desorption isotherm then allowed one to derive both the relative adsorbed solvent volume and corresponding absolute porosity as well as a pore radius distribution via an effective medium approximation and a modified Kelvin formula, respectively.

Contact Angle Measurements. A VCA Optima (AST Products, Inc.) instrument was used to measure the contact angle with a manual controller capable of casting 2 µL of Milli-Q water droplets. Before the measurements were taken, the films were dried using a flow of N$_2$ for 30 s. Static contact angles were measured 5 s after placing the drops on the surface. Three measurements were taken to find the average contact angle.

Results and Discussion

Design and Synthesis of PEO-b-PHA. The design of PEO-b-PHA to target tunable micelle morphologies had several functional requirements: (1) Both the PEO and the PHA blocks have low glass transition temperatures, which are below room temperature (Tg) (Tg PEO=-60° C., Tg PHA=-56° C.) to facilitate micelle equilibration at room temperature when favorable solution conditions are presented; (2) The large hydrophilic-hydrophobic contrast represented by the high Flory-Huggins interaction parameter drives phase separation of the blocks and enables modulation of the reorganization kinetics based upon the presented solution conditions; and (3) The polymer is simple to synthesize in diverse laboratory settings by atom transfer radical polymerization (ATRP) using a chain extension from commercial PEO homopolymers. Different size PEO macroinitiators were synthesized by the esterification of commercial poly(ethylene glycol)methyl ether with 2-bromopropionic acid, see FIG. 2.

Figure 3:
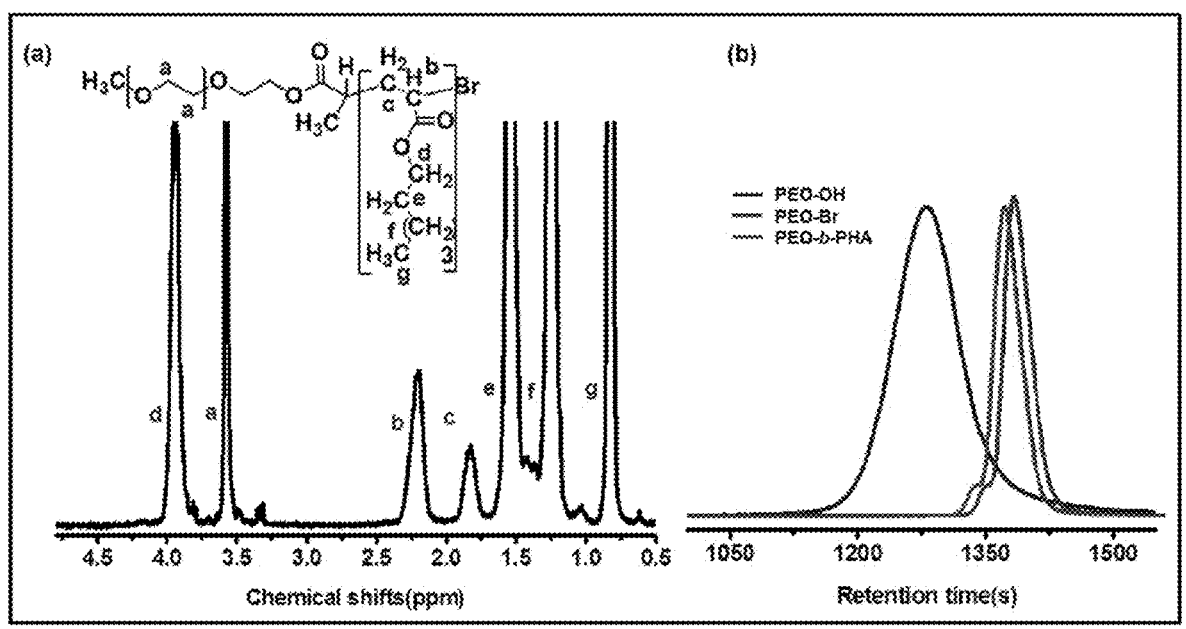
FIG. 3 shows controlled growth of PEO-b-PHA as confirmed using (a) $^1H$ NMR to calculate block ratios.
Figure 5:
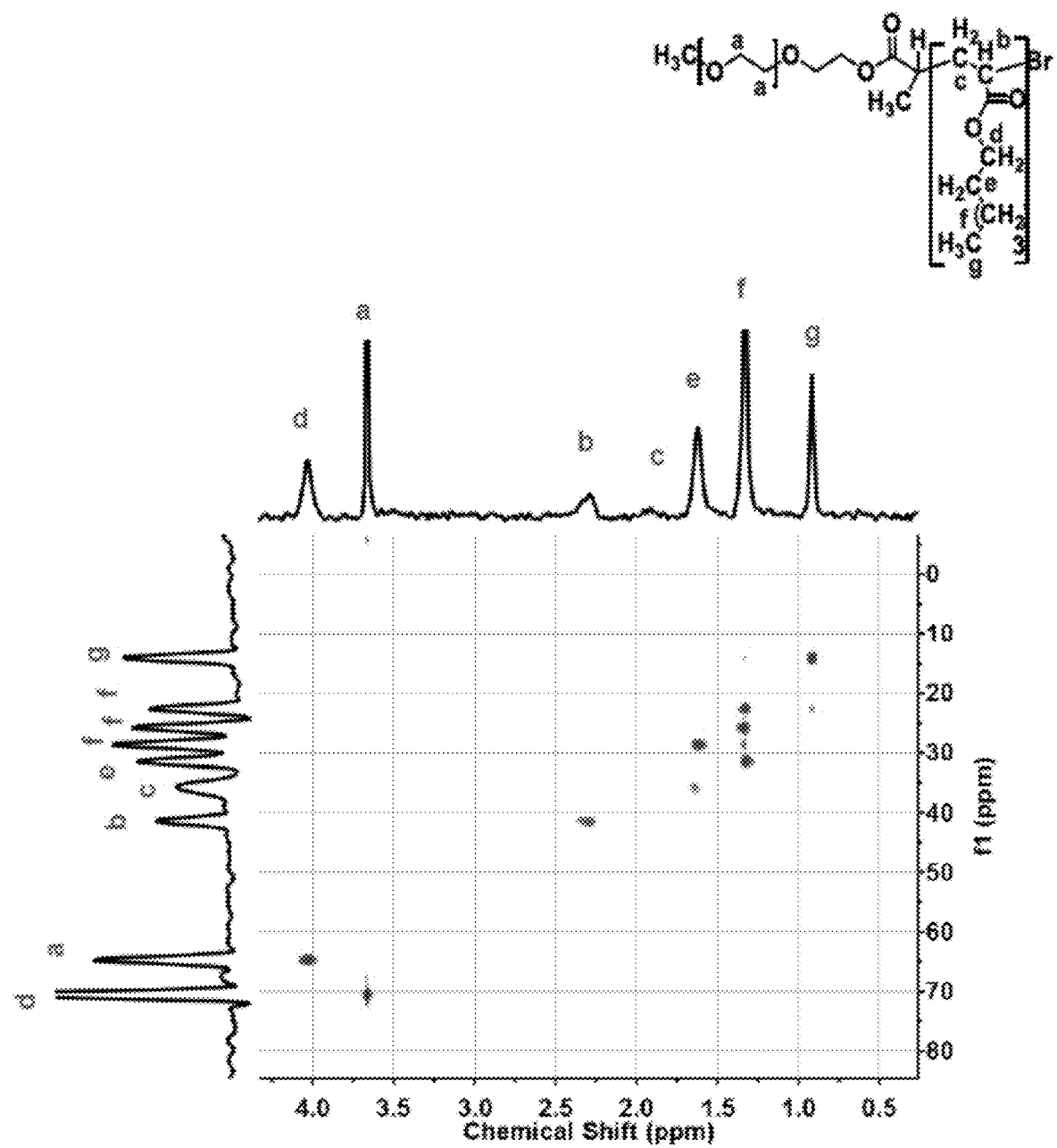
FIG. 5 illustrates $^1H\{^{13}C\}$heteronuclear single quantum coherence.

These macroinitiators were then chain-extended using ATRP in DMF to improve polymerization kinetics. Please note that PHA exhibits tacticity with two different chemical environments for c protons in the backbone, see FIG. 3. The obtained $^1$H NMR, $^1$H-$^1$H correlation spectroscopy (COSY) and the $^1$H-$^{13}$C heteronuclear single quantum coherence (HSQC) for PEO-b-PHA are shown in FIGS. 3-5, respectively. PEO-b-PHA BCPs were synthesized with different molar masses from 8 to 87 kg mol$^{-1}$ and low molar mass dispersities of 1.06-1.29. The obtained dispersity values from GPC and molar masses from $^1$H NMR are tabulated in Table 1, see FIG. 6. The resulting polymers were liquid or semiliquid at room temperature, thus fulfilling the first functional requirement.

Figure 8:
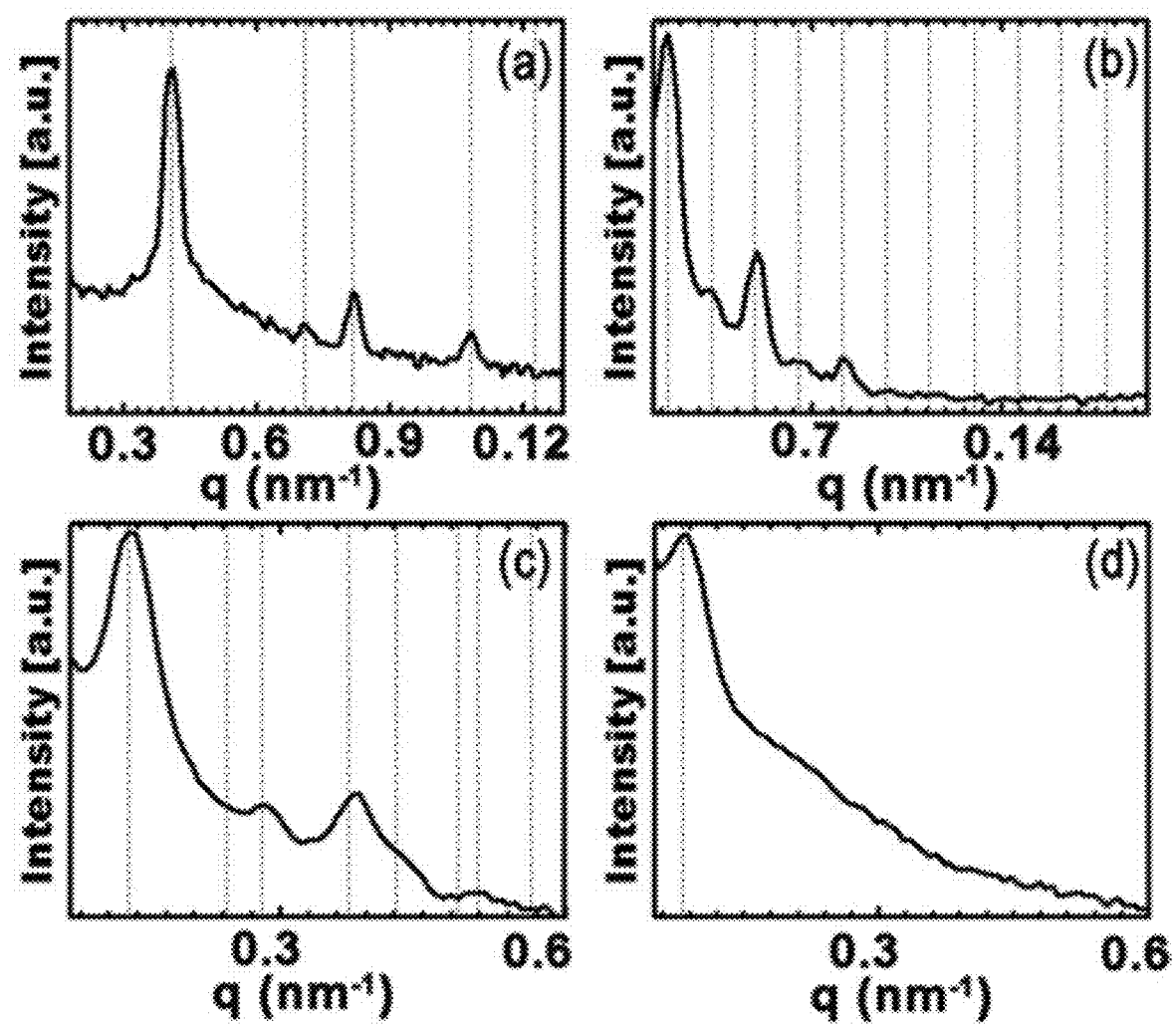
FIG. 8 shows SAXS patterns of different PEO-b-PHAs in order of increasing total molar mass.

PEO-b-PHA Behavior and Flory-Huggins Effective Interaction Parameter (X). The behavior of pure PEO-b-PHA polymers was investigated by small-angle X-ray scattering (SAXS). The data in FIG. 8, SAXS patterns of different PEO-b-PHAs in order of increasing total molar mass as measured in situ at 70° C. (a) P1, (b) P2, (c) P3, (d) P4. Dashed lines indicate the first peak followed by the allowed peaks for hexagonal (a,c) or lamellar (b) symmetry. FIG. 8 shows clear microphase separation for all polymers P1-P4, ranging from 12 to 87 kg mol$^{-1}$.

The principle scattering peaks ranged from q=0.08 to 0.42 nm$^{-1}$, corresponding to 15.4-74.6 nm spacings that scaled monotonically with polymer molar mass, see FIG. 6. The low molar mass P1 formed a well-ordered morphology with numerous higher order reflections at (q/q*)2=1, 3, 4, and 7, consistent with hexagonally packed cylinders. Polymer P2 similarly showed multiple peaks at (q/q*)2=1, 4, 9, 16, and 25 for a well-ordered lamellar morphology, as well as P3 polymer showed multiple peaks at (q/q*)2=1, 4, 7, and 9 for a well ordered hexagonally packed cylinder morphology. In contrast, the higher molar mass P4 polymer exhibited a single peak with a broad shoulder that made for equivocal interpretation of the morphology. In the solid state, significant chain entanglement for such polymers (>87 kg mol$^{-1}$) can inhibit equilibration of more ordered morphologies, particularly with a large X value.

The thermodynamic properties of block copolymers significantly influence their behavior both in the pure state and in solution. The Flory-Huggins effective interaction parameter X largely corresponds to the enthalpic interactions of two species, although it also includes noncombinatorial entropy. The two species interaction described by X may be either between a polymer block and the solvent or between a pair of different polymer blocks. The magnitude of X scales inversely with temperature where heating can be used to drive mixing rather than phase separation. The X value between two polymer blocks can be determined by several methods.

One method is to measure the order-to-disorder transition (ODT) for a series of block copolymers of the same composition but different molar masses and obtain X from the mean field theory (MFT) prediction of the spinodal point. Of the polymers examined, only P1 had an experimentally observable order-to-disorder transition temperature of 200° C. Alternatively, the application of Leibler's random phase approximation (RPA) gives multiple temperature dependent values of X for each polymer and is useful to compare polymers of various compositions. The RPA method models the structure factor dependence of disordered melts above the ODT where mean-field theory (MFT) is well suited. A caveat is that fluctuation effects dominate near the ODT so sufficient excess temperature is needed for meaningful data. Both P5 and P6 had experimentally useful temperature ranges for the disordered melt above the PEO melting point and below the observed decomposition onset temperature of 240° C. The current disclosure focuses on the PHA-rich P5 that was most similar in composition to the polymers employed for coassembly. The SAXS data were collected at different temperatures with a temperature-controlled sample stage. The resulting SAXS profiles were fitted using the RPA model to extract the temperature-dependent values of X. The disordered phase scattering intensity S can be written as a function of scattering vector q as:

$$N/S(q) = F(x, f) - 2_\chi N \qquad (1)$$

where $x =$ (2)

$(qR_g)^2$ and $F(x, f)$ is a combination of Debye functions, which can be written as $$F(x, f) = \frac{g(1, x)}{g(f, x)g(1-f, x) - \frac{1}{4}[g(1, x) - g(f, x) - g(1-f, x)]^2}$$

Figure 9:
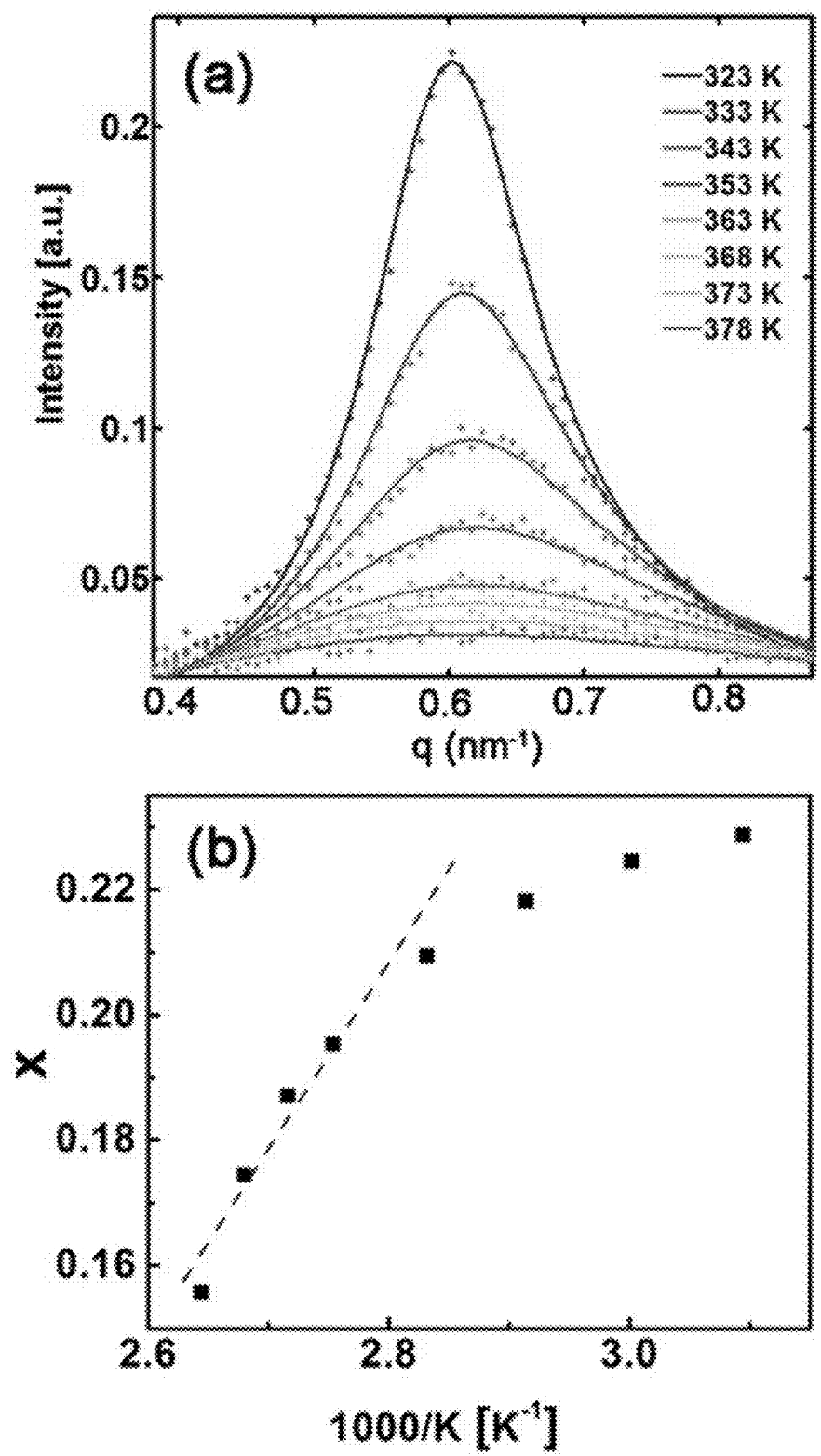
FIG. 9 shows SAXS profiles for the P5 polymer taken in the disordered melt at different temperatures.
Figure 10:
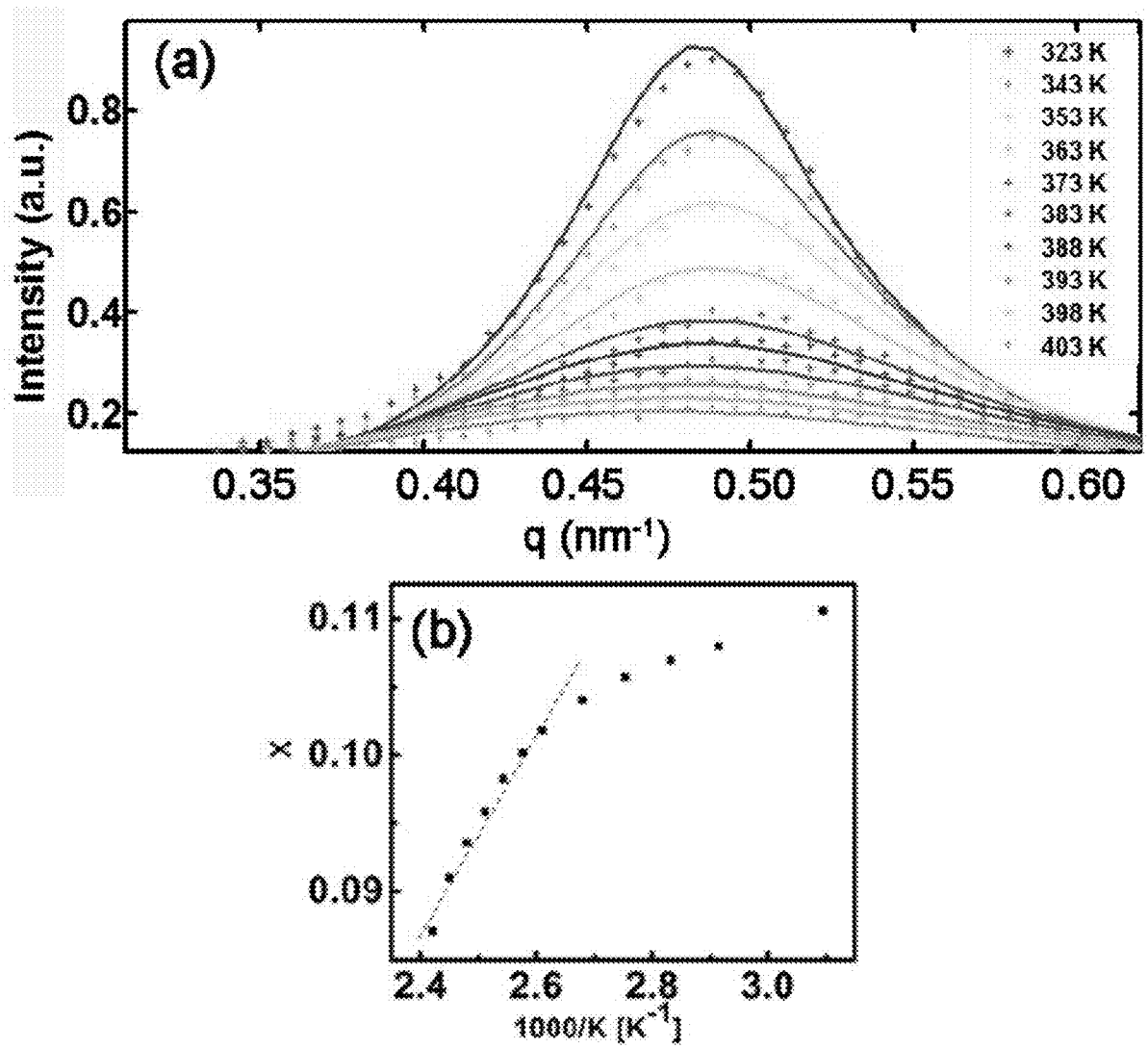
FIG. 10 shows SAXS profiles for the P6 polymer taken in the disordered melt at different temperatures.

$R_g$ is the radius of gyration of the BCP chains in the unperturbed state, and N is the number of lattice sites occupied using a common reference lattice volume of 0.118 nm$^3$. The background scattering from the mica windows was subtracted before fitting. The experimental scattering profiles were fitted using a least-squares optimization for Leibler's RPA model combined with the measured instrumental broadening factor, see FIG. 9, graph a. FIG. 9 shows SAXS profiles for the P5 taken in the disordered melt at different temperatures. The solid lines are the best fits to the experimental data (*) using the random phase approximation at each temperature (a). The temperature dependence of the Flory-Huggins effective interaction parameter X resulting from best fits (b). The best-fits extracted the Rg and X at each temperature. The temperature dependence of X was found to be X=274.5/T−0.5636 for P5, see FIG. 9, graph b. A similar molar mass polymer that was PEO-rich P6 polymer yielded lower X values, see FIG. 10. FIG. 10 shows the SAXS profiles for the P6 polymer taken in the disordered melt at different temperatures. The solid lines are best-fits to experimental data (*) using the random phase approximation at each temperature. (a) The temperature dependence of the effective interaction parameter was extracted from the fits. The temperature dependence of X was found to fit X=81.7/T−0.1097 for P6 (b). This nonideality may be due to the very asymmetric geometry of PHA relative to PEO. Thus, $X_{PEO-PHA}$=0.34 was calculated at 30° C. from P5 for comparison to $X_{PEO-PPO}$=0.085 and $X_{PI-PEO}$=0.33 at the same temperature. Notably PEO-b-PHA has a 4 times larger X value than PEO-b-PPOs and a slightly larger X than PIb-PEOs. Thus, PEO-b-PHA serves as a suitable high X polymer for the kinetic entrapment of micelles.

Guidelines for Selective Tuning of Oxide Wall-Thickness. Solution conditions may be designed to deliberately impede micelle equilibration during coassembly to preserve a persistent population or pore-generating species. This feature is key to enable isomorphic studies where changing inorganic quantities imply changing solution conditions that would otherwise impose an altered micelle size.

The current disclosure tracks the inorganic quantity with the inorganic-to-organic ratio (I:O) that compares the mass of the fully condensed oxide material to the mass of BCP, with the assumption of complete conversion of all metal containing precursors. A coassembly strategy relying on frozen or persistent micelles must consider the thermodynamic X parameter between the solvophobic blocks and the solvent mixture. For the current disclosure, the use of Hildebrand solubility parameters is insightful to estimate the thermodynamic barrier for polymer rearrangement based upon simple measurements of the intermolecular interaction strength of each species. The $X_{12}$ value scales with the square of the difference of the respective Hildebrand solubility parameters (δ) for components 1 (solvophobic block) and 2 (solvent mixture):

$$\chi_{12} = \frac{v}{k_b T}(\delta_1 - \delta_2)^2 \quad (3)$$

where v is the average molecular volume, $k_b$ is Boltzmann's constant, and T is the temperature. With a sufficient barrier for polymer rearrangement, changing the I:O ratio (oxide:polymer) changes the spacing between micelles without changing the micelle size markedly. Please note that kinetic entrapment is the key to this technique because any change in the solution solubility parameter will change the equilibrium micelle size. Such persistent micelles enable a unique level of coassembly control with independently tunable inorganic wall thickness while preserving the pore morphology. Such isomorphic, yet tunable, architectures provide the ideal platform for fundamental measurements of nanoscale phenomena. This approach is significantly different from equilibrating strategies that result in different morphologies with different I:O ratios.

The design of conditions for PMTs has several requirements in need of consideration. (1) First and foremost, the $X_{solvophobe-solvent}$ barrier must be sufficient to halt micelle reorganization on the time scale of film processing. This is most directly tunable by changing the composition of the solvent mixture where the resulting solubility parameter is the sum of the product of each component's solubility parameter with its volume fraction. (2) Although the dynamics of high X BCP aqueous solutions are often immeasurably slow when quiescent, different methods of agitation were recently shown to enable the reorganization by a surface-limited exchange process at the air-solvent interface. A strategy preserving persistent micelles should therefore use mild stirring in lieu of aggressive agitation such as vortexing. (3) Tuning of wall thickness with different I:O ratios may require adjustment of the solution composition to account for water consumption by hydrolyzing inorganic species. The preservation of persistent micelle templates requires that the conditions remain nonergodic after the addition of inorganic precursor. This subtle point is elaborated below where the result of hydrolysis can transition persistent micelles to become dynamic. (4) The length of the solvophobic chain determines the kinetics of micelle dynamics and was shown to have a hypersensitive double-exponential dependence. Thus, achieving persistent micelles requires a balance of solution conditions for sufficient X with respect to the particular solvophobic block size, vide infra. (5) All species must remain in solution throughout the process, including the polymer, the inorganic nanoparticles, and any stabilizing ligands or acids. Most polymers are fairly hydrophobic where solvents such as methanol and water are typical precipitation agents. On the contrary, oxide nanoparticles are often soluble in rather polar solvents. The selection of suitable solvents is often rather limited where much coassembly has been carried out with THF, DMF, anisole, and toluene/butanol mixtures where solvents like ethanol and butanol have also worked with polymers having low X or low molar mass. (6) Last, the components of solvent mixtures generally have different volatilities where evaporation leads to the enrichment of the higher boiling component and will thus change the solubility parameter of the solvent mixture during evaporation. The use of PMTs requires that the polymer chains remain under kinetic control throughout the entire process.

Figure 11:
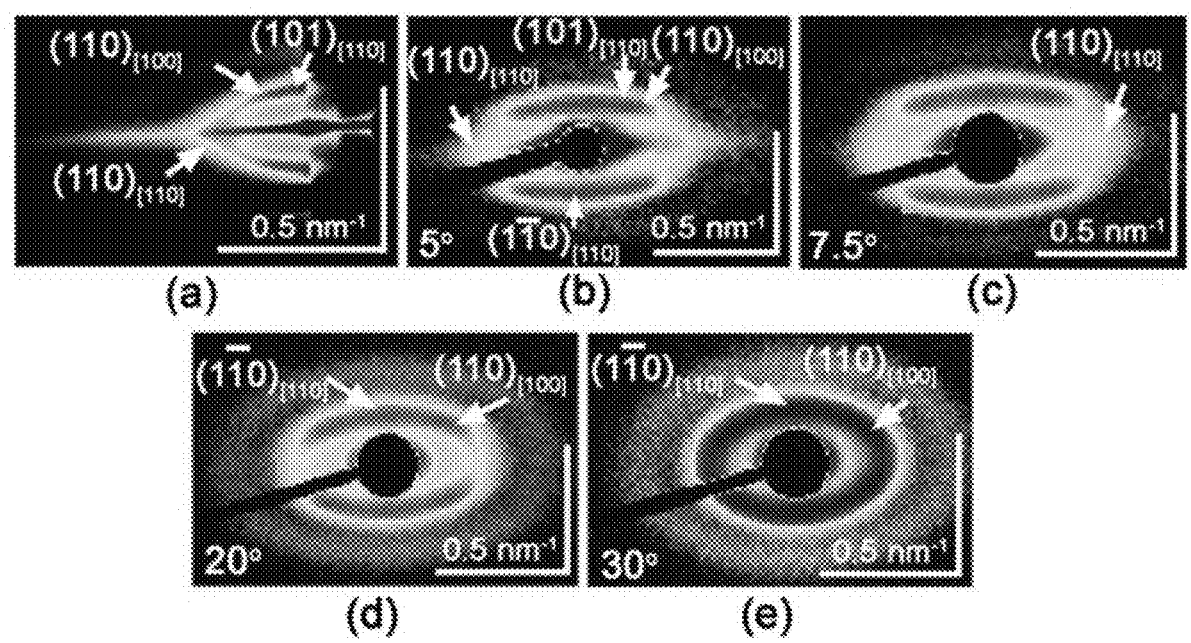
FIG. 11 shows 2D SAXS patterns of P3-1.2-$Nb_2O_5$ at different incident angles.

The morphology of a representative sample from P3 is described before elaborating the PMT strategy. A combination of SAXS and SEM was used to characterize each sample. The films prepared from P3 all exhibited scattering patterns with multiple well-resolved peaks. SAXS patterns from these samples revealed pronounced film texture consistent with a body centered cubic (BCC) morphology where each crystalline grain has either the [110] or the [100] zone axis aligned with the film normal and with a random orientation within the sample plane. For example, sample P3-1.2-$Nb_2O_5$ when measured in a grazing incidence (GISAXS) geometry exhibited localized $(110)_{[110]}$ and $(101)_{[110]}$ peaks consistent with [110] oriented BCC grains, but also included some additional intensity consistent with $(110)_{[100]}$ peaks with [100] textured BCC grains, see FIG. 11, view a. FIG. 11 shows 2D SAXS patterns of P3-1.2-$Nb_2O_5$ at different incident angles from grazing incidence (a, αi=0.22° silicon wafer) to transmission from 5° to 30° (b-e, mica substrates). Reflections consistent with specific planes arising from specific crystalline orientations relative to the substrate are indicated with arrows and are labeled with parentheses and bracket subscripts, respectively. All color scales correspond to the log of the X-ray intensity. The same film was prepared on X-ray transparent mica substrates for incident angle-dependent SAXS measurements using a transmission geometry (FIG. 11, views b-e). As was previously calculated for a tilt series of this BCC mixed texture, tilting the sample at low incident angles (for purposes of example only) 0-7.5° preserved the $(110)_{[110]}$ peaks, which then disappeared at higher incident angles (for purposes of example only 20°+) as a result of the finite thickness of the Ewald sphere, see FIG. 11, view d. At both 20° and 30° incident angle, peaks consistent with the $(110)_{[100]}$ from [100] BCC textured grains were clearly observed, strengthening the interpretation of a mixed texture BCC morphology. The scattering patterns were elongated relative to the film normal where the asymmetry was maximum near 0° incident angle. The trend in elongation is indicative of film compression along the film normal and is common for coassembled systems. The $(101)_{[110]}$ peak exhibited a d101=33.9 orientations including both in-plane (uncompressed) and out-of-plane (compressed) directions. The purely in-plane lattice constant was calculated by fitting an ellipse to the elongated first ring scattering pattern corresponding to the {110} family of planes at different orientations. The in-plane lattice parameter was calculated from the in-plane position of this ring at $q_z$=0, and yields a value of a=38.9 nm.

Figure 12:
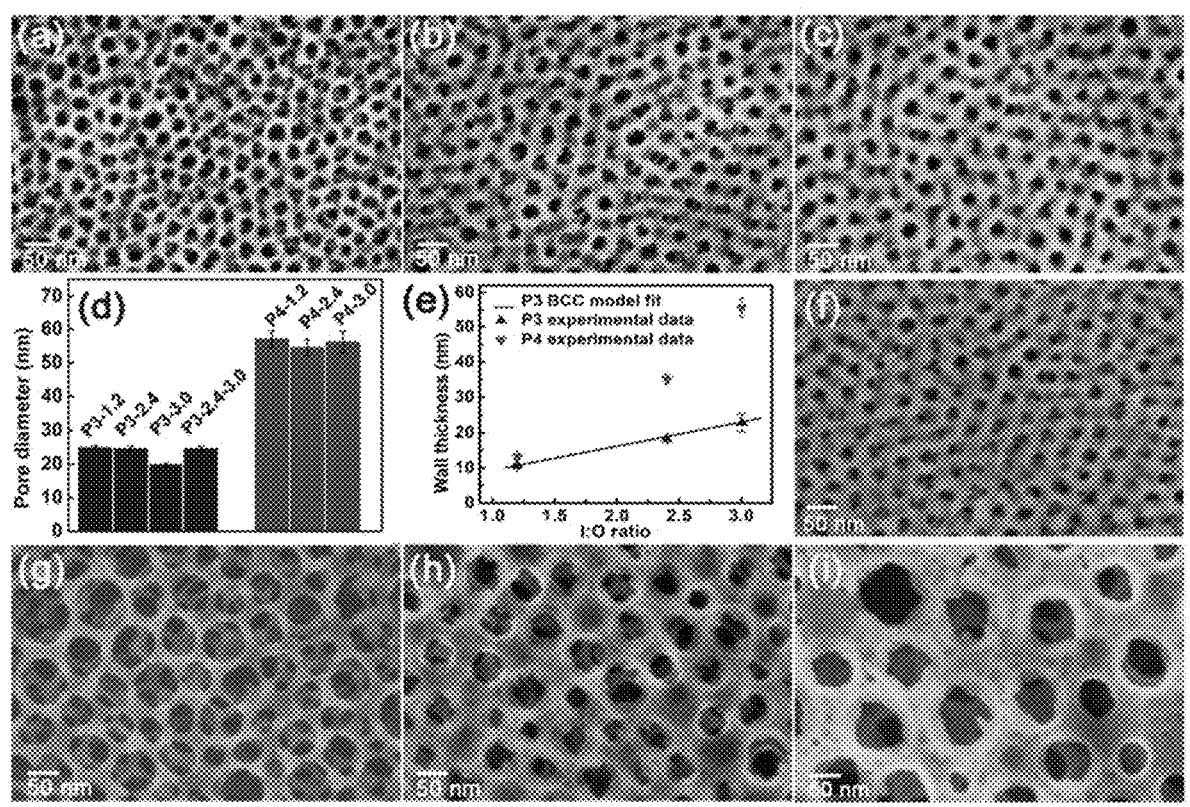
FIG. 12 shows SEM images of calcined $Nb_2O_5$ thin films resulting from polymers P3 (a-c, f) and P4 (g-i).

SEM images of P3-1.2-$Nb_2O_5$ after calcination exhibited a characteristic pore size (black) with a periodic niobium oxide (white) structure, see FIG. 12, view a. FIG. 12 shows SEM images of calcined $Nb_2O_5$ thin films resulting from polymers P3 (a-c, f) and P4 (g-i). From left to right, the films vary by the I:O from 1.2 to 2.4 to 3.0. Film P3-2.4-3.0-

Figure 13:
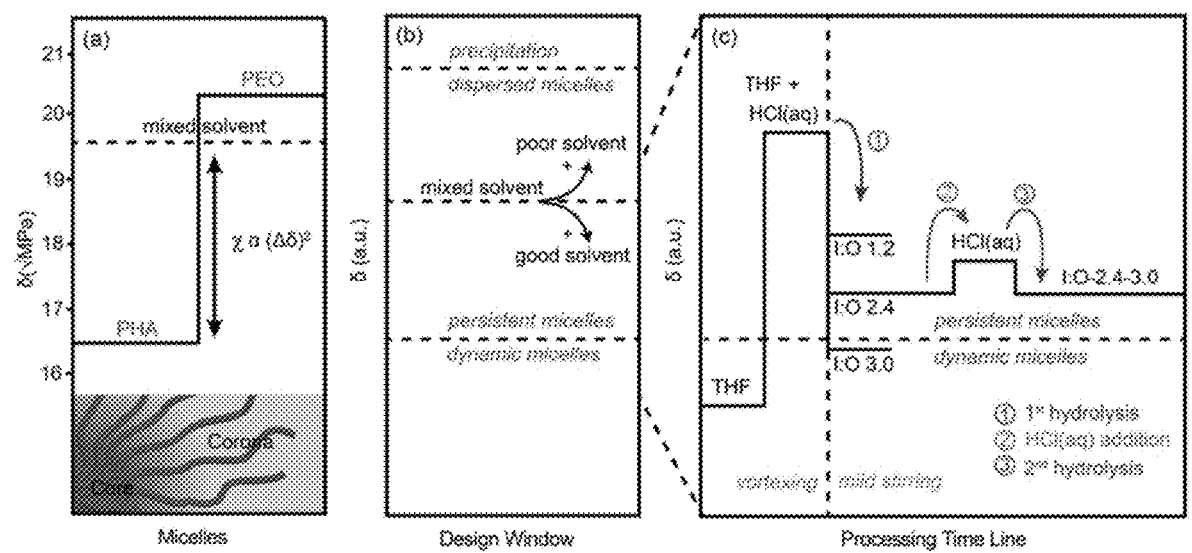
FIG. 13 shows plots of Hildebrand solubility parameters for designing persistent micelle templates.
Figure 14:
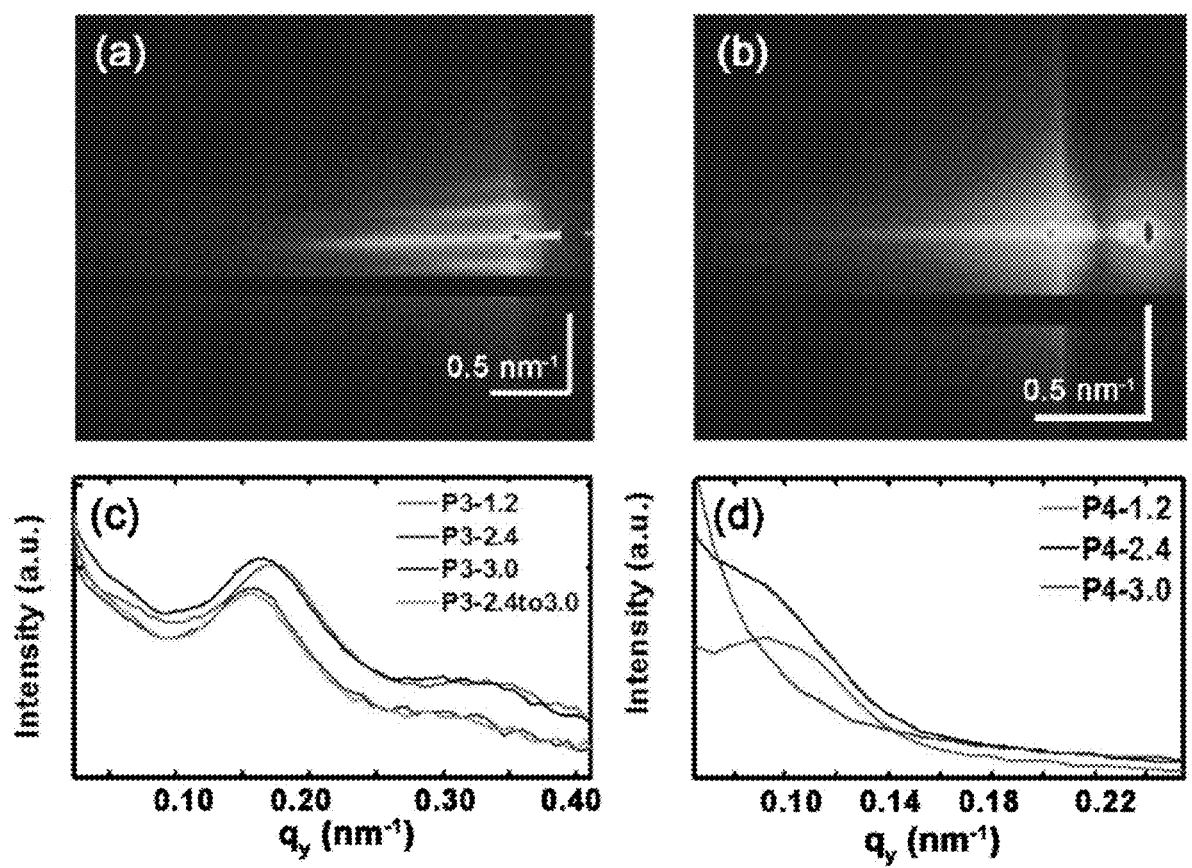
FIG. 14 shows 2D GISAXS measurements after calcination and at an incidence angle of $\alpha_i$=0.22° for P3-1.2-$Nb_2O_5$ (a) and as-made P4-1.2-$Nb_2O_5$ (b).

Nb$_2$O$_5$ (f) was made by adding additional water before adding further inorganic to reach I:O=3.0 as shown schematically in FIG. 13. FIG. 13 shows plots of Hildebrand solubility parameters for designing persistent micelle templates. The tunable separation of solubility parameters between the solvophobic block and the solvent (a) estimates the thermodynamic barrier to micelle reorganization. Under vigorous mixing (THF+HCl$_{(aq)}$), the system may equilibrate, whereas mild stirring conditions result in persistent micelles (b). Coassembly strategies for PMTs must maintain solution conditions for micelles that are dispersed and nondynamic, or persistent (b). Under vigorous vortexing (THF+HCl$_{(aq)}$), the system progresses toward equilibrium, whereas mild stirring conditions preserve persistent micelles (c). The addition of inorganic components shifts the solution conditions through hydrolysis (c) and may be accounted for with rational changes to the solution conditions to preserve persistent micelles. Average pore diameters are preserved under proper solution conditions for both P3 and P4 samples (d). The tunable wall-thickness was plotted as a function of the I:O ratio used where the data from P3 were fitted well with a simple BCC model (e). The in-plane orientation recorded by SEM is expected to have 2-fold symmetry for the [110] textured grains and 4-fold symmetry for the [100] textured grains. The recorded electron micrographs were consistent with both expected textures, although the local disorder complicated the interpretation. The small grain sizes were indicative of limited long-range order at the surface and led to a range of in-plane lattice parameters from 33.5 to 35.2 nm. These SEM measurements of the in-plane lattice constant were similar to the 38.9 nm in-plane lattice constant determined from GISAXS measurements after elliptical correction. GISAXS measurements on the same sample after calcination are shown in FIG. 14. FIG. 14 shows 2D GISAXS measurements after calcination and at an incidence angle of $\alpha_i$=0.22o for P3-1.2-Nb$_2$O$_5$ (a) and as-made P4-1.2-Nb$_2$O$_5$ (b). The in-plane cuts of the scattered intensity as a function of q$_y$ (at constant q$_z$) were extracted from the 2D images by integrating over a stripe of 10 pixels along the sample plane q$_y$, P3 (c) and P4 (d). a) and b) color scales correspond to the log of the X-ray intensity. Thus, for all subsequent P3 samples, the same elliptical fitting was used to derive the inplane lattice constant for comparison to the in-plane SEM measurements, see FIG. 15 (Table 2) and FIG. 12.

Figure 16:
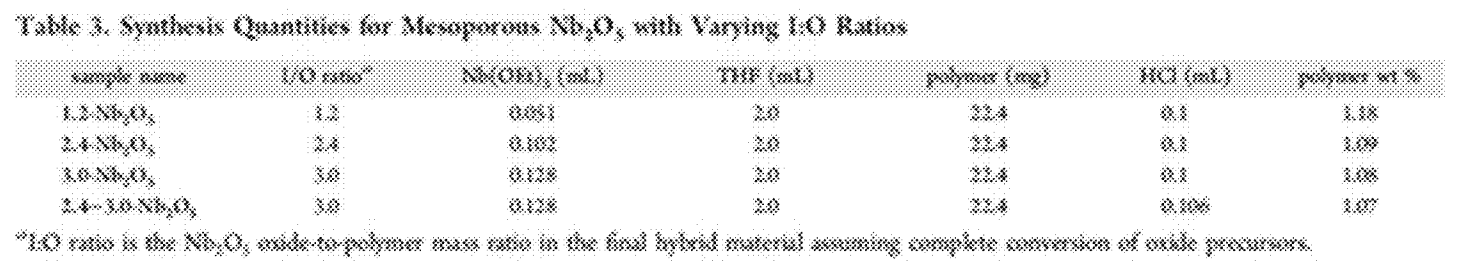
Figure 18:
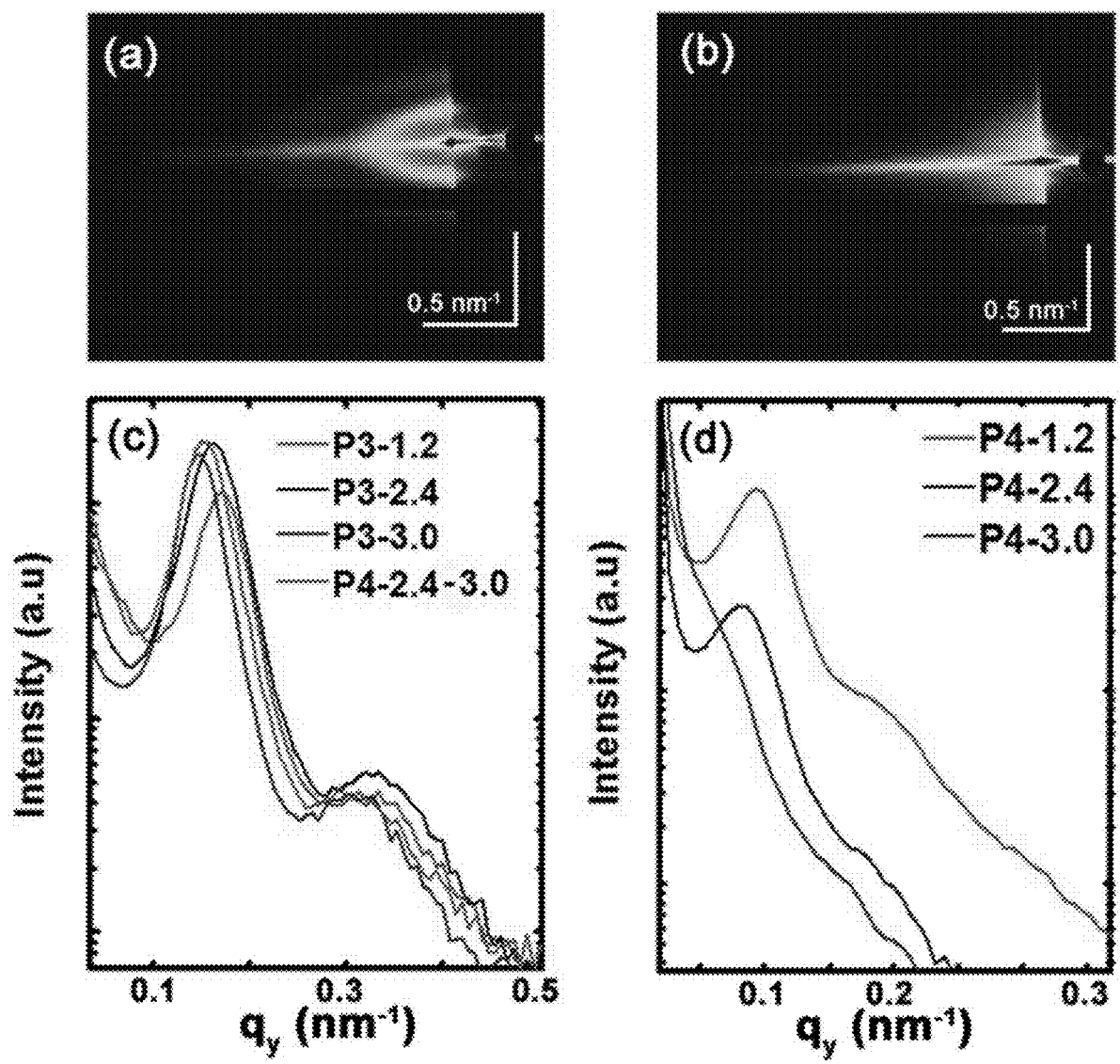
FIG. 18 shows 2D GISAXS images measured at an incidence angle of $\alpha_i$=0.22° for as-made P3-1.2-$Nb_2O_5$ (a) and P4-1.2-$Nb_2O_5$ (b).

A series of films were prepared using PEO-b-PHA to demonstrate the application of the PMT solution design guidelines and were characterized with GISAXS and SEM. The coassembly solutions all had the same amount of solvent, aqueous hydrochloric acid, and polymer at the start of processing, where the main variable was the amount of inorganic precursor added later, see FIG. 16. FIG. 16 shows Table 3: Synthesis Quantities for Mesoporous Nb$_2$O$_5$ with Varying I:O Ratios. At this first stage, extensive vortexing was used to enable micelle equilibration under thermodynamically challenging solution conditions. The addition of inorganic sol precursors leads to hydrolysis reactions that lower the thermodynamic barrier to reorganizing, see FIG. 13. For PEO-b-PHA in THF-water mixtures, the solutions with higher water content after hydrolysis will have higher solubility parameters and different equilibrium micelle sizes. However, the use of kinetically limiting conditions enables the preservation of the micelle size distribution. Thus, a significant amount of water (3.6 v %) was used to favor high XPHA-solution conditions for micelles with a starting solution Hildebrand parameter of 19.65 √MPa, see FIG. 16 and FIG. 17. FIG. 17 shows Table 4: Solution Composition and Hildebrand Parameters of the P3 Films during the Processing Steps. Films were dip coated from these solutions and promptly aged at elevated temperatures to drive the condensation of the inorganic material and inhibit subsequent polymer reorganization. The GISAXS patterns of all films showed the specular reflection peak, Yoneda peak, and the scattering signal from the transmitted beam. The specular reflection is located at the position where the reflected angle is equal to the incident angle forming an intense peak. Sample P3-2.4-Nb$_2$O$_5$ was very similar to the previously described P3-1.2-Nb$_2$O$_5$ sample, with the same lattice parameter determined by GISAXS and an indistinguishable pore size of 24.6±0.8 versus 24.9±0.6 nm, respectively, see FIG. 12 a and b and FIG. 18, view c. FIG. 18 shows 2D GISAXS images measured at an incidence angle of αi=0.22° for as-made P3-1.2-Nb$_2$O$_5$ (a) and P4-1.2-Nb$_2$O$_5$ (b). The in-plane cuts of the scattered intensity as a function of q$_y$ (at constant q$_z$) were extracted from the 2D images. 2D image color scales correspond to the log of the X-ray intensity. The current disclosure focuses on calcined samples and report the average value along with the standard error of the mean to statistically compare pore size populations with several nanometers of standard deviation. To ease sample comparison, the in-plane scattering vector qy is plotted for each sample, see FIG. 18, view d. Both the in-plane scattering angle of and the out-of-plane plane scattering angle Ψ are used to calculate the q$_y$ component at off-specular conditions where $\alpha_i \neq \alpha_f$ and $2\theta \neq 0$:

$$q_y = \frac{2\pi \cos \alpha_f \sin \Psi}{\lambda} \quad (4)$$

The in-plane cuts of the scattered intensity as a function of q$_y$ (at constant q$_z$) were extracted from the 2D detector images by integrating over a stripe of 10 pixels width to improve the signal-to-noise. In contrast to the similar GISAXS patterns, see FIG. 14, view c, these two samples had significantly different oxide wall-thicknesses of 10.6±0.4 and 18.2±0.8 nm for P3-1.2-Nb$_2$O$_5$ and P3-2.4-Nb$_2$O$_5$, respectively, see FIG. 12, view e and FIG. 15. For the current disclosure, doubling the I:O ratio led to a nearly doubled oxide wall thickness while preserving the same pore structure. In contrast, further increasing the inorganic content with sample P3-3.0-Nb$_2$O$_5$ led to a reduced pore size of 19.8±0.5 nm and an increased lattice spacing of 45.4 nm. The statistically significant change in pore size indicates a dynamic micelle population that reorganized in response to the water consumption associated with the hydrolysis of niobium ethoxide, see FIG. 13, view c. Indeed, the reduced X parameter upon addition of hydrolyzing inorganic precursors would favor an equilibrium point with reduced micelle size. Assuming complete hydrolysis that exchanges water for ethanol, the resulting solutions should have 2.73-1.43% water and 1.71-4.13% ethanol mixed with THF and would have a Hildebrand parameter of 19.53-19.34 √MPa, see FIG. 17. This range of solubility parameter values for the solvent mixtures was used with the 16.64 √MPa76 solubility parameter estimated for PHA to estimate a range of X$_{solvophobe-solvent}$ values from 0.47 to 0.51, see FIG. 17. These X values are close to the transition from persistent micelles to dynamic micelles, vide infra, and are lower than more extreme X=3.5 systems to facilitate equilibration assisted by vortexing. The transition from persistent micelles to dynamic micelles, see FIG. 13, view b, is suppressed using the PMT approach and may be corrected by increasing $X_{PHA\text{-}solution}$ with additional water content to preserve nonergodic conditions, see FIG. 13. However, adding extra water at the start of the experiment changes the starting conditions for micelle equilibration and can lead to the precipitation of the polymer. Thus, a two-step strategy was developed for P3-2.4-3.0-Nb$_2$O$_5$ starting from the conditions of sample P3-2.4-Nb$_2$O$_5$, followed by the addition of extra water (HCl) to increase the $X_{PHA\text{-}solution}$ before the subsequent addition of further niobium ethoxide to raise the I:O ratio to 3.0, see FIG. 13, view c. This systematic approach is designed to preserve the original micelle population and is quantitatively documented in terms of solubility parameters in Table 4, see FIG. 17. The resulting SEM images exhibit 24.6±0.7 nm pores that are indistinguishable from samples P3-1.2-Nb$_2$O$_5$ and P3-2.4-Nb$_2$O$_5$ and indicate a return of the assembly conditions to kinetic control for PMTs, see FIG. 12 views a, b, f. SEM measurements of the oxide wall-thickness indicated an expansion to 23.8±0.8 nm and a correspondingly increased in-plane lattice dimension of 44.5 nm by SAXS, see FIG. 15, Table 2. The PMT approach with P3 enabled the systematic control of wall-thickness from 10.6±0.5 to 23.8±0.8 nm while preserving an isomorphic structure with statistically indistinguishable average pore size and the same pore symmetry, see FIG. 12, view e and FIG. 15, Table 2. These observed wall-thickness for the highly ordered P3 samples agreed well with a simple geometrical model of BCC spheres of constant micelle radius with variable matrix volume as a result of the different I:O ratios:

$$t = r\sqrt[3]{\left(\frac{\rho_{org}}{\rho_{inorg}}x+1\right)\frac{8\pi}{3}} - 2r$$

where t is the wall-thickness, r is the pore radius, $\rho_{org}$ is the PHA density, $\rho_{inorg}$ is the inorganic density, and X is the I:O ratio. A natural result of this model is the expansion of the BCC lattice parameter with increasing inorganic content, as was observed by GISAXS, see FIG. 15, Table 2. Samples prepared from the higher molar mass P4 exhibited similar morphology trends with larger feature sizes. The SEM images for P4 films are shown in FIG. 12, views a-c, where the wall-thickness is monotonically controllable from 13.1±0.8 to 36.3±0.9 to 55.7±2.8 nm, see FIG. 12, view e, and FIG. 15: Table 2. The significant 55.7 nm average wall thickness for sample P4-3.0-Nb$_2$O$_5$ represents the largest wall thickness obtained from a micelle coassembly approach. In contrast to P3, the micelles of P4 are significantly larger and have a larger standard deviation due to the significant chain length dependence for the initial equilibration step. The morphologies resulting from P4 coassembly thus had less long-range order than P3, which is as expected for a polymer that forms only short-range ordered structures in the pure state after annealing, see FIG. 8, view d. The pore sizes for P4-1.2-Nb$_2$O$_5$ and P4-3.0-Nb$_2$O$_5$ were statistically indistinguishable at 57.0±2.5 and 56.1±3.2 nm, respectively. Interestingly, the same I:O=3.0 solution conditions that failed to kinetically trap the smaller molar mass P3 were able to kinetically trap the larger molar mass P4 micelles. This demonstrates that the critical value of $X_{solvophobe\text{-}solvent}$ is dependent on the molar mass of the solvophobe, as expected. GISAXS patterns of most P4 samples produced several in-plane spots that elongated along $q_z$, see FIG. 18, views b, d. Considering the width of the pore size distribution for P4 samples, see FIG. 15: Table 2, it is not surprising that the SEM images appear to be a disordered packing of spheres, see FIG. 12, views g-i. The periodicity of GISAXS peaks from P4 films was attributed to the random packing of spheres based upon the disorder observed by SEM, see FIG. 12, views g-l. Such random packing of hard spheres can have multiple peaks resulting from the radial distribution function where there may not be a simple relationship for the observed scattering peak to the physical dimensions of the system. In particular, P4-3.0-Nb$_2$O$_5$ did not exhibit a clear scattering peak, but rather a shoulder near q=~0.08 nm$^{-1}$, indicating a decrease in long-range order, see FIG. 18, view d. These samples demonstrate the application of a robust conceptual map for tunable nanofabrication with micelles using semiquantitative guidelines to achieve tunable isomorphic architectures from persistent micelle templates. The precise control of pore-size and wall-thickness in the in-plane direction is crucial to a variety of electrochemical devices where transport within the electrolyte and within the oxide both primarily occur normal to the substrate.

Figure 19:
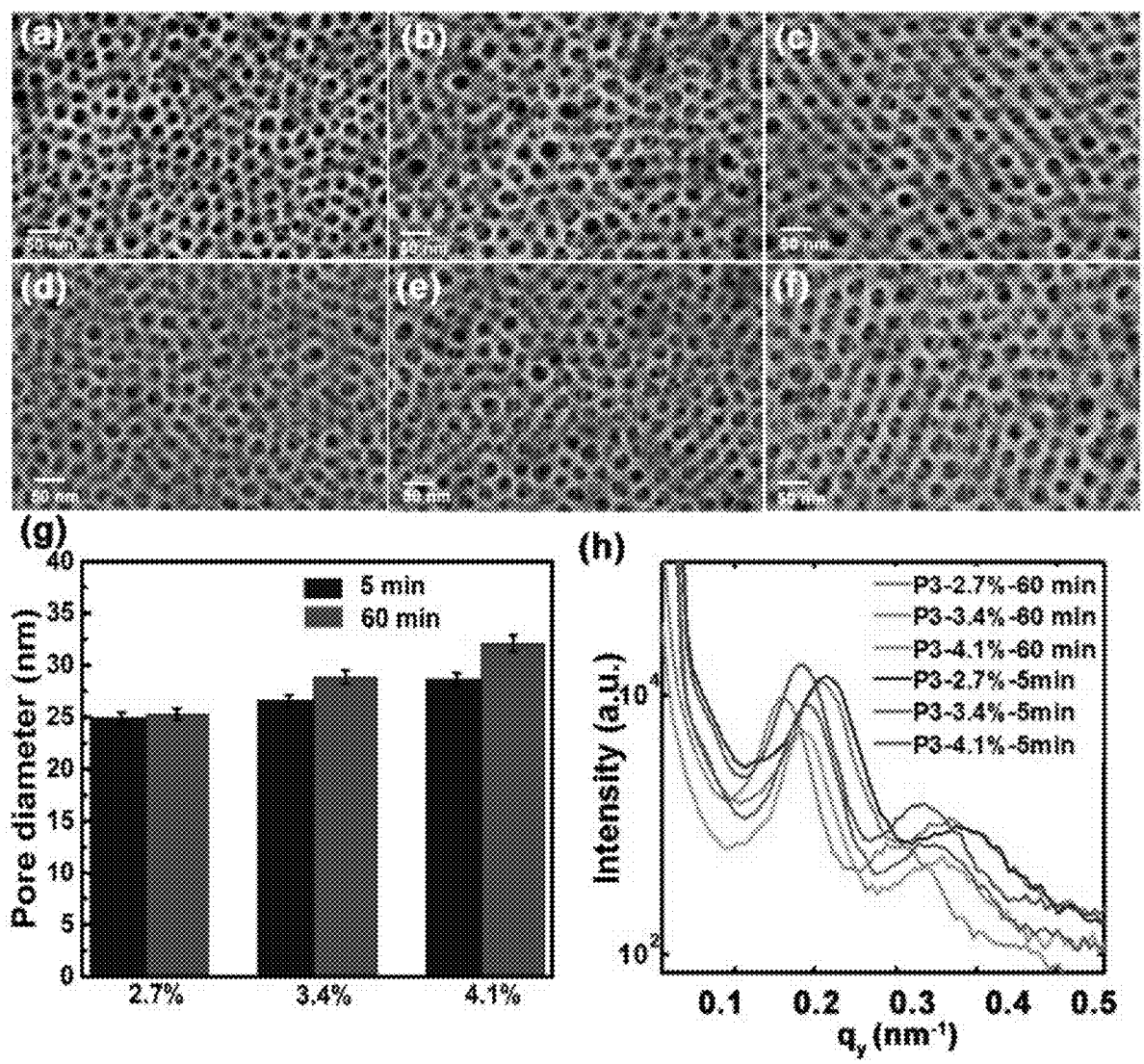
FIG. 19 shows SEM images of calcined samples with P3 and I:O=1.2 resulting from different final water content (a),(d) 2.7% (b),(e) 3.4% (c),(f) 4.1% and with different vortexing time (a-c) 5 min and (d-f) 60 min.

It should be understood that "persistent micelles" do not imply equilibrated micelles at any stage of the processing. Considering the large molar masses and kinetically challenging conditions, one should not expect the micelles to fully equilibrate on a laboratory time scale. The effect of the vortexing time and the enthalpic barrier to reorganization (final water content) was studied using P3, see FIG. 19. FIG. 19 shows SEM images of calcined samples with P3 and I:O=1.2 resulting from different final water content (a),(d) 2.7% (b),(e) 3.4% (c),(f) 4.1% and with different vortexing time (a-c) 5 min and (d-f) 60 min. The average pore diameters are shown for each sample (g). The in-plane cuts of the scattered intensity as a function of $q_y$ (at constant $q_z$) were extracted from the 2D images along the sample plane $q_y$ (h) and GISAXS data measured at an incidence angle of $\alpha_i$=0.30°. As expected, the average micelle diameters monotonically increased with increasing the final water content in the coassemble solutions, FIG. 19, views a-c. Comparing different vortexing times, 5 versus 60 min, increasing average micelle sizes were observed with extended agitation, with a more significant effect for samples with higher water content, FIG. 19, views d-f. These data evidence slower equilibration kinetics with increasing $X_{PHA\text{-}solvent}$ and suggest that much longer agitation times could be used to achieve more-equilibrated and yet larger pore sizes with a given polymer. The GISAXS data for all the 60 min vortexed samples showed lower q values than the corresponding 5 min vortexed samples, consistent with the formation of larger unit cell lattice parameters, FIG. 19, view h.

Figure 20:
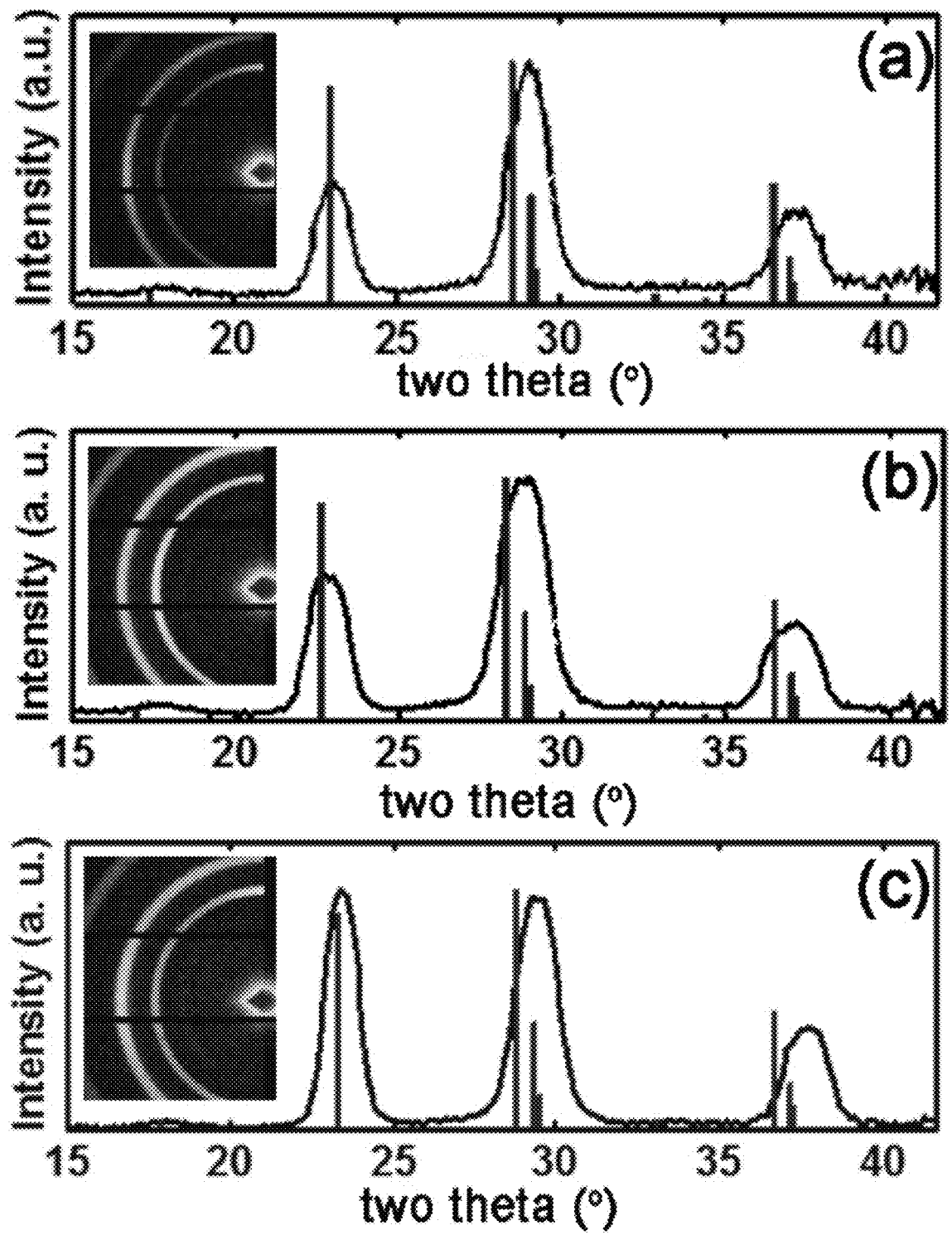
FIG. 20 shows azimuthally integrated GIWAXS data for $Nb_2O_5$ plotted with fit lines for orthorhombic $Nb_2O_5$ PDF #27-1003 with I:O loadings of (a) 1.2 (c) 2.4 and (e) 3.0.

Crystallization of Oxide Nanostructures. GIWAXS measurements were made on the Nb$_2$O$_5$ thin films after calcination to 600° C. to demonstrate highly crystalline materials, see FIG. 20. FIG. 20 shows azimuthally integrated GIWAXS data for Nb$_2$O$_5$ plotted with fit lines for orthorhombic Nb$_2$O$_5$ PDF #27-1003 with I:O loadings of (a) 1.2 (c) 2.4 and (e) 3.0. Original 2D data are inset with color scales correspond to the log of the X-ray intensity. The resulting patterns all showed intense isotropic peaks that were consistent with the formation of orthorhombic Nb$_2$O$_5$ (PDF no. 27-1003). Scherrer analysis of P3-1.2-Nb$_2$O$_5$ measured with a transmission geometry on a mica substrate led to an estimated average crystallite size of 7.7 nm that was smaller than the above-reported wall-thicknesses. In contrast to Pluronic-based coassembly approaches, the large feature sizes accessible with higher molar mass polymers enable larger feature sizes that easily survive the formation of crystallites with high temperature heat treatments.

The calcination of porous films also induced compression along the out-of-plane direction, normal to the substrate.

Figure 21:
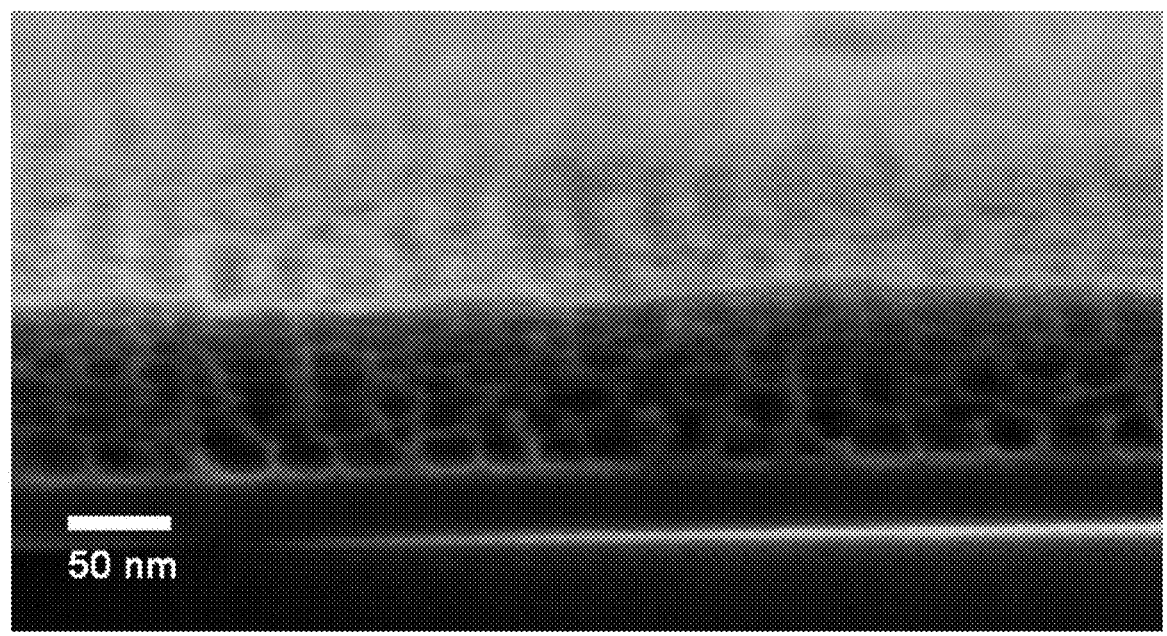
FIG. 21 SEM cross-section of calcined P3-1.2-$Nb_2O_5$ film imaged at a 10° incident angle.

Anisotropic film compression is widely reported and expected for a substrate-supported porous film where the in-plane constraint of substrate dimensions causes significant compression in the out-of-plane direction as the inorganic densifies and crystallizes. In the out-of-plane direction, the pores shrank by 58.2% for P3-1.2-$Nb_2O_5$ as evidenced by cross-sectional SEM, see FIG. 21. FIG. 21 shows SEM cross-section of calcined P3-1.2-$Nb_2O_5$ film imaged at a 10° incident angle. A similar extent of film contraction was reported for sol-gel derived $TiO_2$ thin films with 47.7% shrinkage.

For comparison, the out-of-plane lattice contraction was obtained by GISAXS. The out-of-plane lattice parameter was obtained by fitting an ellipse to the (110) peak to extract the purely out-of-plane component as 9.8 nm. The observed out-of-plane lattice contraction of 74.9% was larger than the contraction of the pores in the same direction, indicating shrinkage of the walls in the out-of-plane direction.

Figure 22:
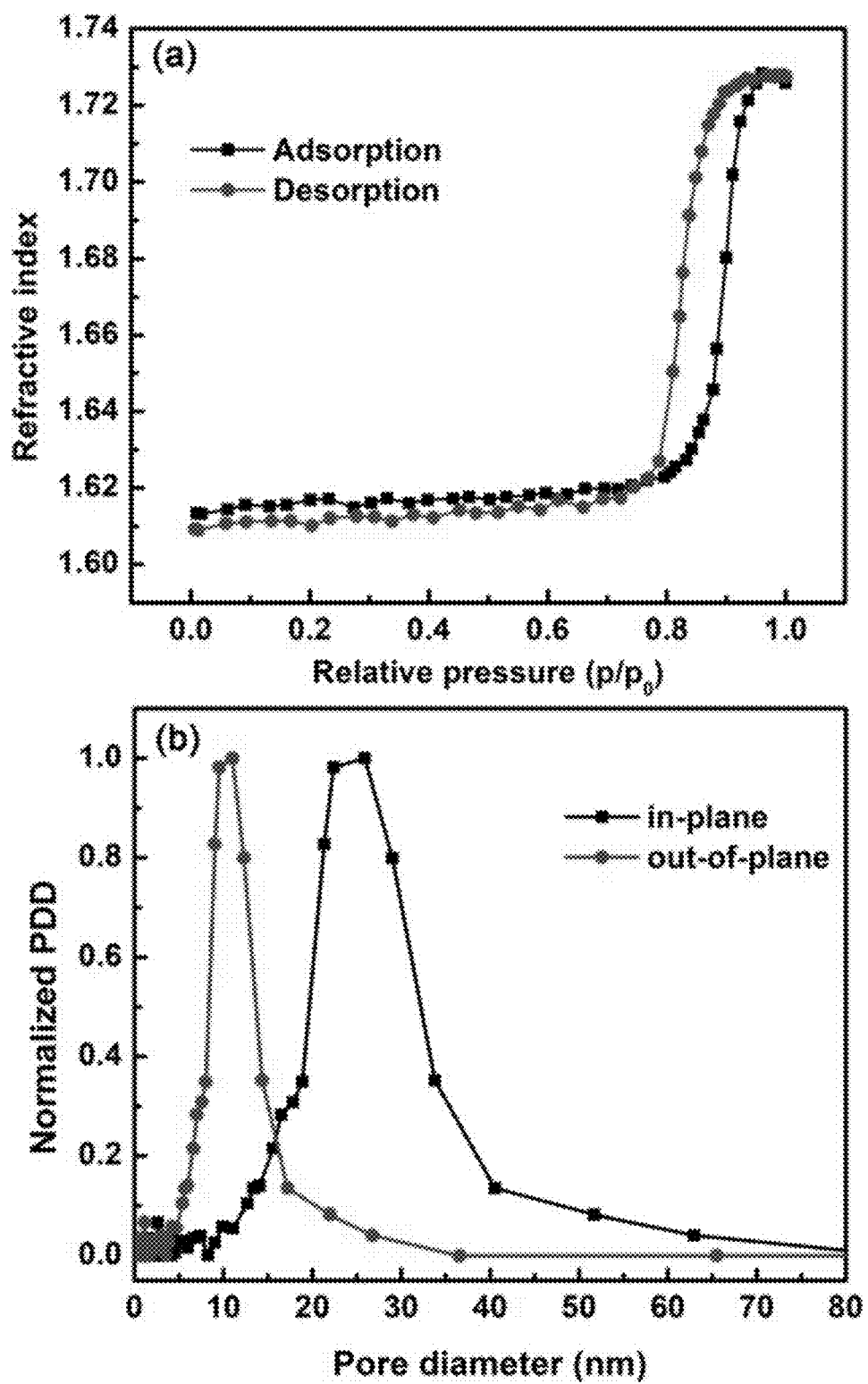
FIG. 22 shows ellipsometric porosimetry of P3-1.2-$Nb_2O_5$ sample.
Figure 23:
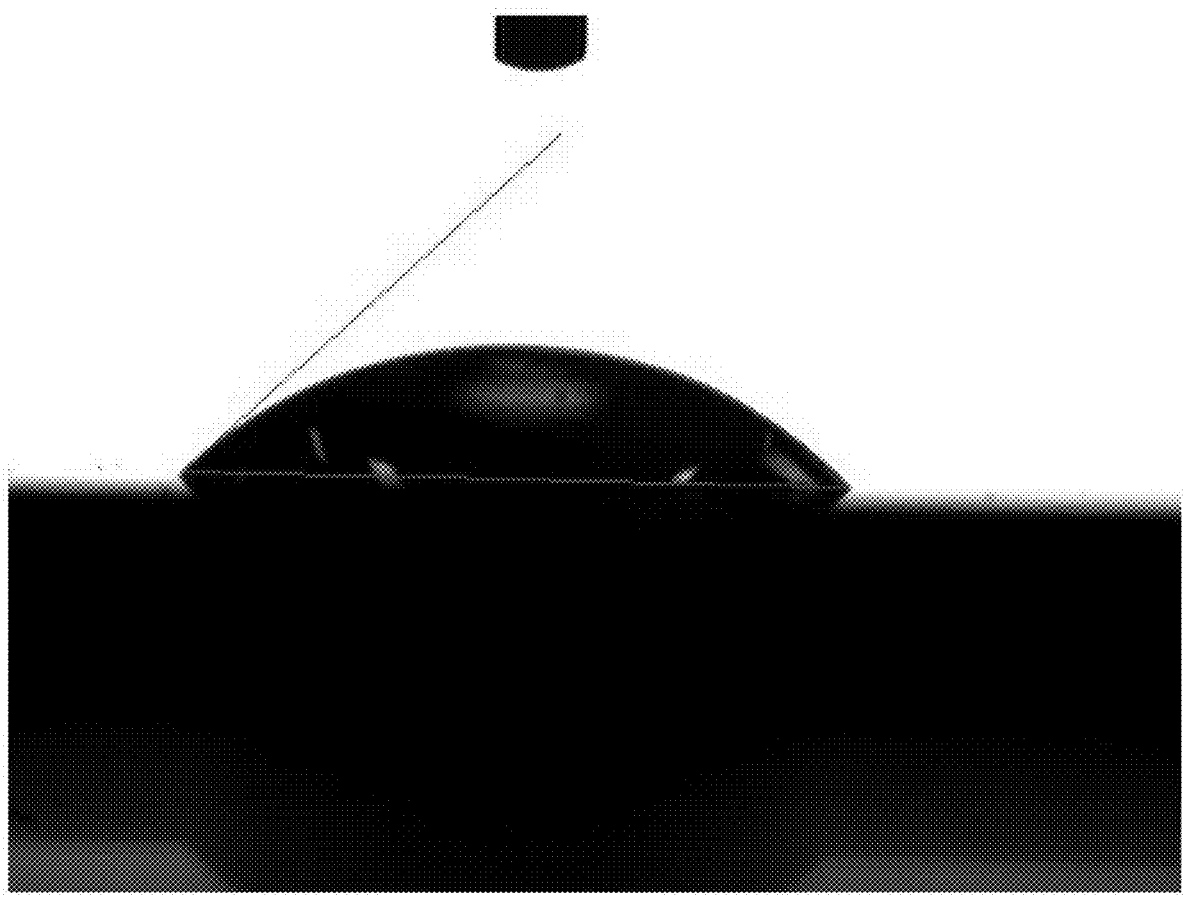
FIG. 23 shows the contact angle for water measured on a flat sol-gel derived $Nb_2O_5$ film after calcination.

Ellipsometry porosimitry (EP) measurements were performed on P3-1.2-$Nb_2O_5$ thin films. Type IV isotherms were observed, see FIG. 22. FIG. 22 shows Ellipsometric porosimetry of P3-1.2-$Nb_2O_5$ sample. (a) Refractive index isotherm that corresponds to the adsorption of water molecules into the pores. (b) In-plane and out-of-plane pore diameter distributions (PDD) were obtained from a modified Kelvin model for ellipsoidal mesopores. A Tauc-Lorentz dispersion law was applied to the data to obtain values of the refractive index at each humidity point, corresponding to the adsorption of water molecules into the pores. Note that the samples were measured at incremental steps of 0.01 relative humidity to acquire sufficient data points for a well-defined isotherm. The plateau for the adsorption isotherm was reached at a relative pressure of 0.95, indicating that the pores were completely filled. Subsequently, the relative adsorbed solvent volume was derived from the refractive index isotherm following an effective medium approximation. The corresponding pore diameter distribution (PDD) based on a modified Kelvin formula is shown in FIG. 22, view b. On the basis of SEM image analysis, we accounted for the ellipsoidal shape of the pores with an anisotropy ratio of 2.4 between the in-plane and out-of-plane diameter. A modified Kelvin model that accommodates for the pore anisotropy by a geometric coefficient G was consequently used. Furthermore, a contact angle of 43° was taken into account, as experimentally determined for water on a flat sol-gel derived $Nb_2O_5$ film, see FIG. 23. FIG. 23 shows the contact angle for water measured on a flat sol-gel derived $Nb_2O_5$ film after calcination. The average contact angle was determined to be 43°. The results for a mean in-plane and out-of-plane pore diameter of 25.5 and 10.8 nm, respectively, are well in line with data obtained from SEM image analysis, where values of 24.9 and 10.6 nm were determined.

Figure 24:
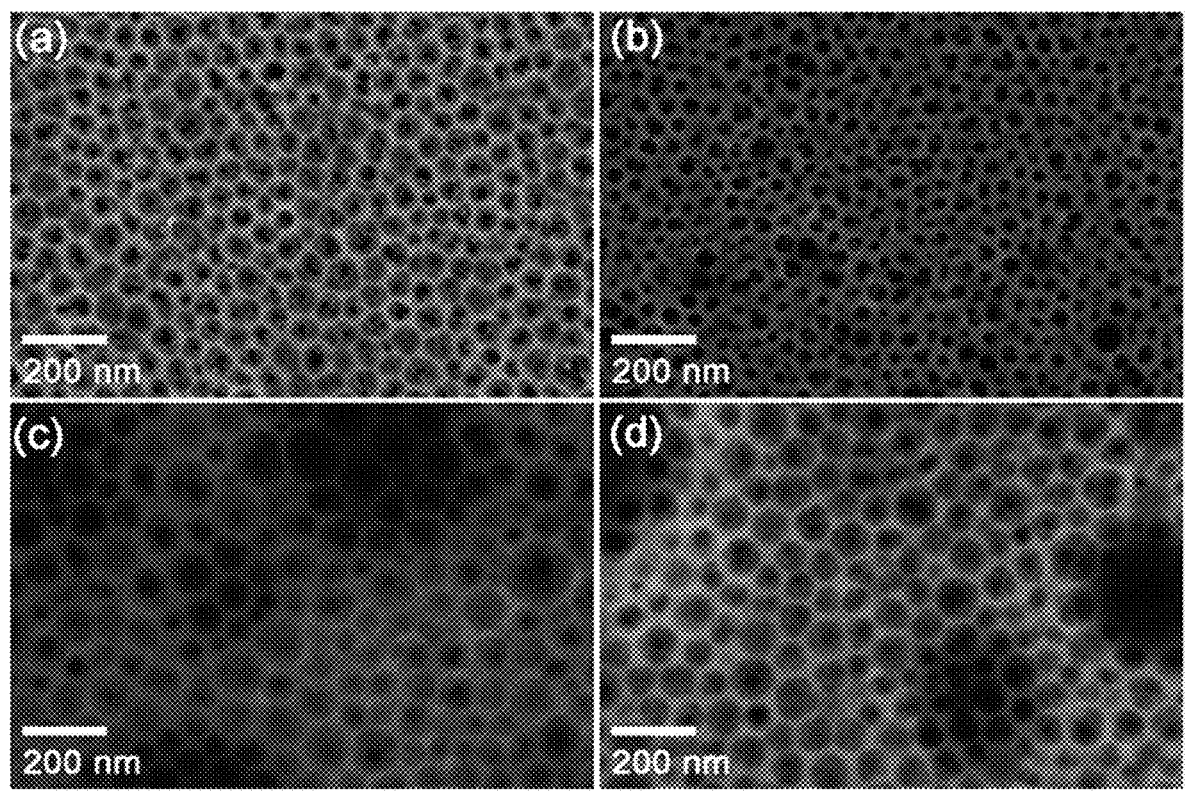
FIG. 24 shows SEM images of various inorganic coassembled systems with P4 polymer: as-made (a) $WO_3$ and (c) $SiO_2$, as well as calcined (b) $WO_3$ and (d) $SiO_2$.
Figure 26:
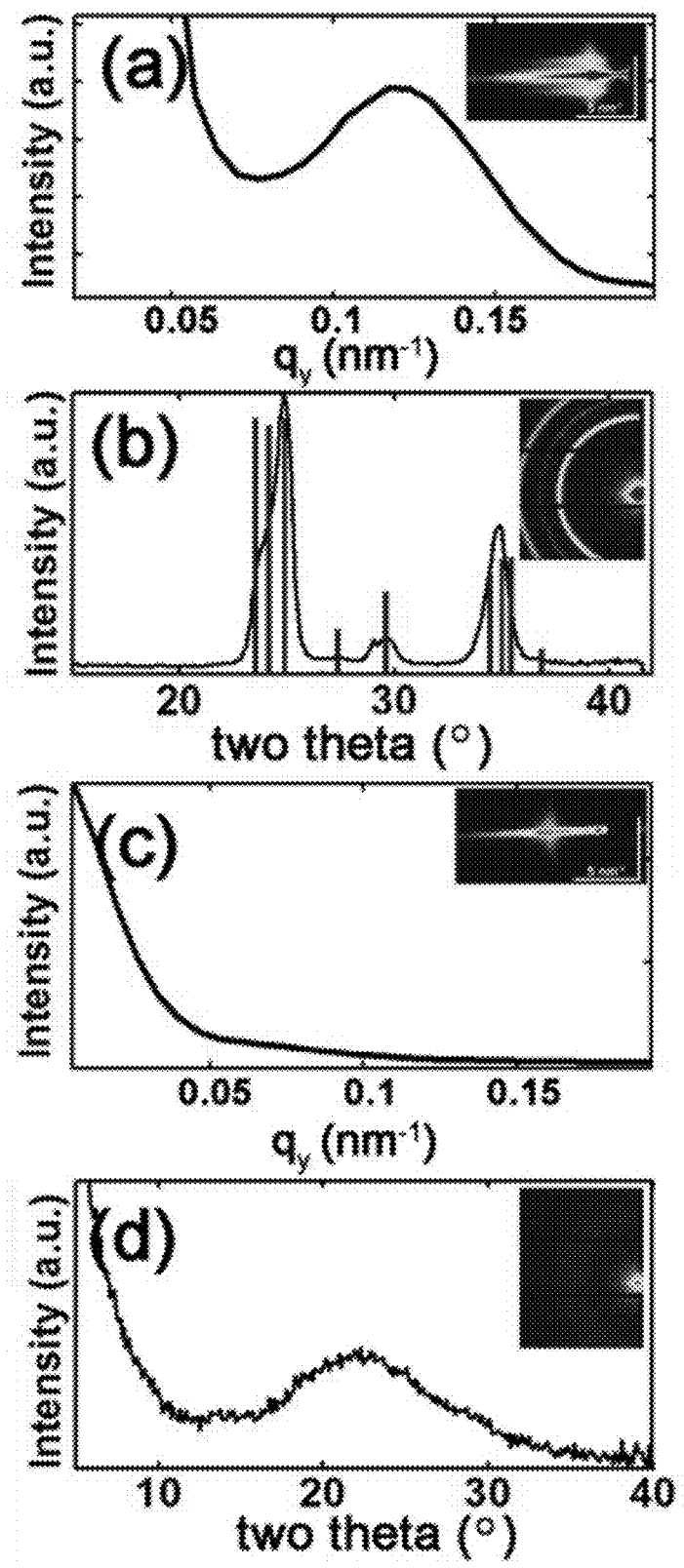
FIG. 26 shows GISAXS measurements were used to extract the in-plane scattering intensity as a function of $q_y$ (at constant $q_z$) for (a) $WO_3$ and (c) $SiO_2$ (2D images inset).

Generalization to Diverse Oxides and Pore Size Tuning. The compatibility of micelle templating strategies using PEO-b-PHA with diverse oxides was elaborated with $WO_3$ and $SiO_2$. The resulting porous $WO_3$ and $SiO_2$ films were composed of similar spherical pores as discussed above for numerous $Nb_2O_5$ samples. SEM images of both the as-made and the calcined films of $WO_3$ and $SiO_2$, see FIG. 24, are consistent with disordered spherical micelles, as we previously found for the same P4 polymer with $Nb_2O_5$. FIG. 24 shows SEM images of various inorganic coassembled systems with P4 polymer: as-made (a) $WO_3$ and (c) $SiO_2$, as well as calcined (b) $WO_3$ and (d) $SiO_2$. The calcined films were crack free, and the pore structure was well preserved. Very large 75.2±2.9 nm diameter pores were observed by SEM for $SiO_2$, which was attributed to the additional water content associated with optimized sol recipes that naturally favor larger micelles, see FIG. 25: Table 5. FIG. 25 shows characterization of different mesoporous inorganic systems after calcination. The corresponding GISAXS profiles for $WO_3$ showed a distinct peak at 0.123 $nm^{-1}$ corresponding to 51.1 nm periodicity, see FIG. 26; view a, and 25. FIG. 26 shows GISAXS measurements were used to extract the in-plane scattering intensity as a function of $q_y$ (at constant $q_z$) for (a) $WO_3$ and (c) $SiO_2$ (2D images inset). GIWAXS measurements for (b) $WO_3$ experimental were most consistent with orthorhombic $WO_3$ PDF no. 89-4479, whereas the (d) $SiO_2$ remained amorphous. All 2D image color scales correspond to the log of the X-ray intensity, see FIG. 26; view a and FIG. 25. In contrast, GISAXS data for $SiO_2$ did not exhibit clear peaks, see FIG. 26; view c. As with $Nb_2O_5$, both $WO_3$ and $SiO_2$ survived high temperature calcination to 600° C. The GIWAXS data obtained for $WO_3$ calcined films showed intense isotropic peaks that were indexed as orthorhombic $WO_3$, see FIG. 24; view b, PDF no. 89-4479, while $SiO_2$ remained amorphous at this temperature, see FIG. 26; view d.

Figure 27:
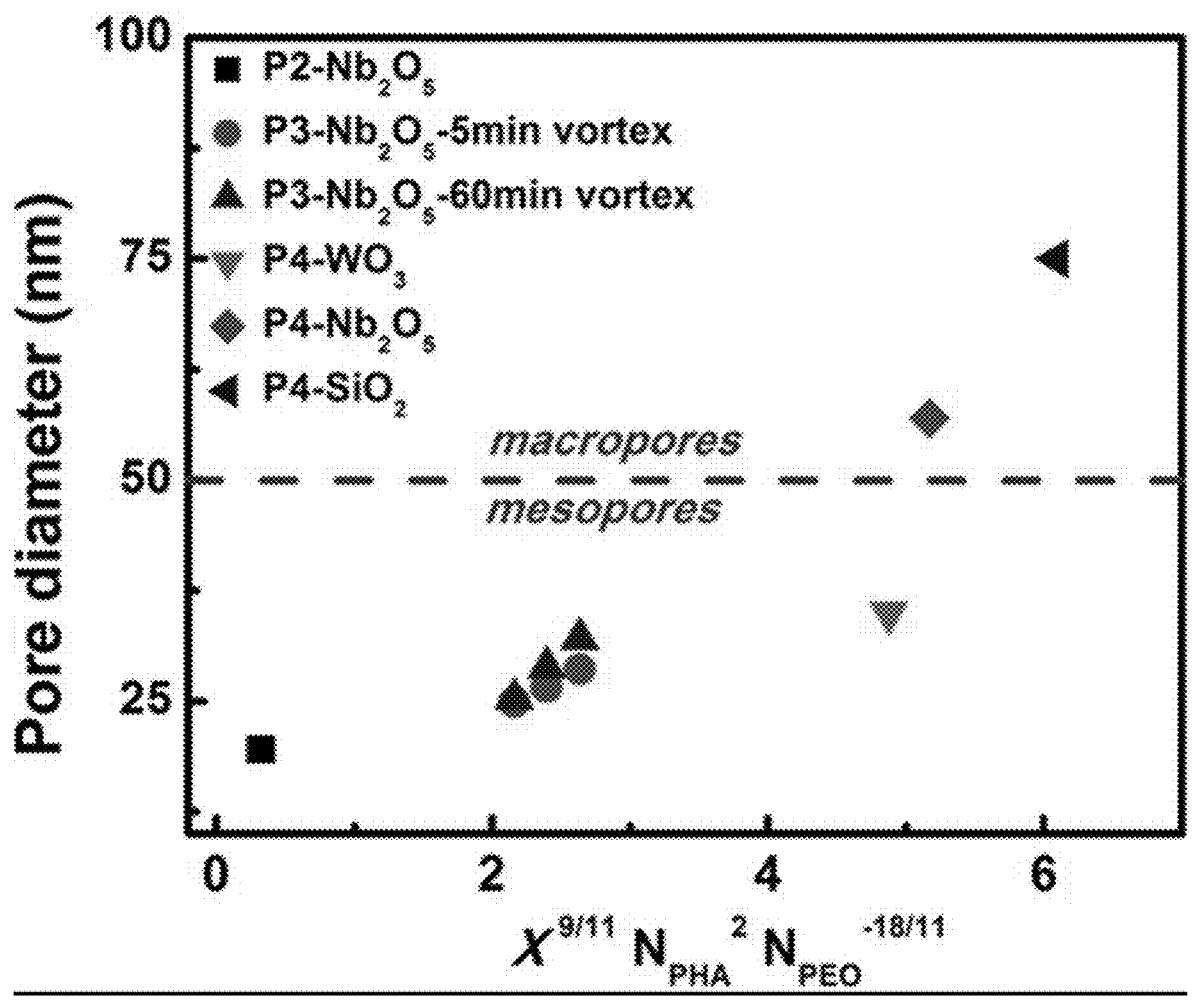
FIG. 27 shows a wide range of pore sizes were accessible by changing the polymer block lengths and/or the solution conditions.

Tunable Pore Size with Solution Conditions and Molar Mass. Continuous access from mesoporous structures to macropores structures is demonstrated with two control parameters: (1) changing the molar mass of the PEO-b-PHA block copolymers and (2) changing the water content during the micelle equilibration stage, see FIG. 13; view c. The average pore size for a wide variety of samples is shown in FIG. 27. FIG. 27 shows a wide range of pore sizes were accessible by changing the polymer block lengths and/or the solution conditions. Pore sizes scaled monotonically with the scaling relationship for intermediate micelles. The core radius and thus the resulting pore diameter should scale linearly with $(X^{9/11}N_{PHA}^2 N_{PEO}^{-18/11})^{1/3}$. For example, the several samples prepared with P4 demonstrate multiple pore sizes as a result of the different water content in the starting solutions, see FIG. 28. FIG. 28 shows Table 6—Parameters Correlated to the Final Pore Size for Micelle Scaling Relationships. Higher water content increases the $X_{solvophobe-solvent}$, which favors a reduction of total system surface area by expanding the micelles and increasing the aggregation number at the expense of chain stretching. The pore size resulting from polymer micelles was crudely correlated to the assembly conditions using a scaling relationship for equilibrated intermediate micelles. The micelle core radius is proportional to $(X^{9/11}N_{PHA}^2 N_{PEO}^{-18/11})^{1/3}$, where $N_{PHA}$ is the degree of polymerization of PHA and $N_{PEO}$ is the degree of polymerization of PEO. The current disclosure assumes that with persistent micelles, the final pore diameter after calcination scales linearly with the hydrodynamic core diameter. In this study, the data obtained were most consistent with an intermediate micelle model that includes the free energy of the corona and assumes a majority of the hydrophobic block.

Despite the use of nonfully equilibrated micelle solutions, see FIG. 19, this scaling relationship yielded significant predictive power for correlating changes in both polymer molar mass and in $X_{solvophobe-solvent}$ to the resulting pore size. Notably, the $WO_3$ sample had smaller pores than predicted by this scaling model, which was attributed to the more protic conditions resulting from $WCl_6$ hydrolysis. More protic conditions could increase the ionic-repulsion of the corona to favor lower aggregation numbers. We also note that P2-$Nb_2O_5$ deviated slightly from the intermediate model, where such PEO-rich SDAs would likely follow a star-like model. Remarkably, the PMT strategy based upon PEO-b-PHA enabled access to pore sizes ranging from 10 to 80 nm that span from mesopores all of the way into the macropore regime. This broad range of pore sizes bridges the gap normally found between polymer coassembly and colloidal templating.

CONCLUSIONS. Solution processing guidelines were presented to enable the persistent micelle templating of isomorphic nanostructures. Such architectures are ideal for nanomaterial development with adjustable inorganic wall-thickness and seamless access from mesoporous structures to macropores structures. Under appropriate solution conditions, a simple adjustment of inorganic-to-organic ratio changes the micelle-to-micelle distance without changing the nominal micelle size. A newly reported PEO-b-PHA was used to demonstrate this design concept where the use of a sufficiently high $X_{solvophobe-solution}$ contrast is the key to maintaining persistent micelle templates regardless of changing equilibrium conditions. This robust design strategy enabled the achievement of mesopores and macropores with a single design strategy that fills the gap typically found between block copolymer routes and colloidal templating. The resulting materials were stable at higher temperatures such as 600° C. and enabled the formation of multiple crystalline transition metal oxide frameworks.

The current disclosure has produced a broad range of tunable pore sizes that fill the gap typically found between block copolymer approaches and colloidal approaches. The resulting materials are stable to high temperatures and enable the formation of multiple crystalline oxide frameworks. Exemplary uses of this technology include catalysts, batteries, pseudocapacitors, fuel cells, optical coatings While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of fabricating isomorphic nanostructure of $Nb_2O_5$, $WO_3$ or $SiO_2$ with adjustable wall thickness comprising:
dissolving a structure directing agent having a Flory-Huggins interaction parameter from 0.25-0.35 in an anhydrous solvent selected from tetrahydrofuran (THF), dimethylformamide (DMF), anisole and toluene/butanol mixtures, wherein the structure directing agent is polyethylene oxide-b-hexyl acrylate), i.e. PEO-b-PHA, a block copolymer, heating the block copolymer solution to completely dissolve the block copolymer, slowly adding concentrated hydrochloric acid to the dissolved block polymer solution, vortexing the hydrochloric acid added block copolymer solution, adding desired amount of inorganic metal oxide precursors selected from niobium oxide precursor, $WO_3$ precursor and $SiO_2$ precursor into the vortexed hydrochloric acid and block copolymer solution, wherein the formed mixed solution of inorganic metal oxide precursor, hydrochloric acid and the block copolymer hinders the exchange of polymer chains of the block copolymer between micelles thus leading to kinetic entrapment of persistent micelle templates (PMT) having certain pore diameter and pore size for forming isomorphic nanostructure;
adding more inorganic metal oxide precursor material into the previously formed mixed solution of the block copolymer, hydrochloric acid and the inorganic metal oxide precursor having persistent micelle templates, wherein the block copolymer inhibits micelle re-equilibration thus the total loadings of inorganic metal oxide precursor amount controls the formed inorganic metal oxide wall thickness while maintaining the micelle pore diameter and pore size.

2. The method of claim 1, wherein the micelle final pore sizes created may range from mesopores to macropores.

3. The method of claim 2, wherein the micelle pore sizes range from 20 to 75 nm.

4. The method of claim 1, wherein at least one micelle is incorporated into a film.

5. A design strategy of fabricating isomorphic nanostructures of $Nb_2O_5$, $WO_3$ or $SiO_2$ having mesopores and macropores, and with adjustable wall thickness comprising:
providing a block copolymer of poly(ethylene oxide-b-hexyl acrylate), i.e. PEO-b-PHA, having a large hydrophilic-hydrophobic contrast represented by its high Flory-Huggins interaction parameter in a range of 0.25-0.35,
using the block copolymer as a directing agent,
dissolving the block copolymer in an anhydrous solvent selected from tetrahydrofuran (THF), dimethylformamide (DMF), anisole and toluene/butanol mixtures, heating the block copolymer solution to completely dissolve the block copolymer, slowly adding concentrated hydrochloric acid to the dissolved block polymer solution, vortexing the hydrochloric acid added block copolymer solution, adding desired amount of inorganic metal oxide precursors selected from niobium oxide precursor, $WO_3$ precursor and $SiO_2$ precursor into the vortexed hydrochloric acid and block copolymer mixed solution, wherein the formed mixed solution of inorganic metal oxide precursor, hydrochloric acid and block copolymer hinders the exchange of polymer chains of the block copolymer between micelles thus leading to kinetic entrapment of persistent micelle templates (PMT) having certain pore diameter and pore size for forming isomorphic nanostructure;
adding more inorganic metal oxide precursor material into the previously formed mixed solution of structure directing agent, hydrochloric acid and the inorganic metal oxide precursor having persistent micelle templates, wherein the block copolymer inhibits micelle re-equilibration thus the total loadings of inorganic metal oxide precursor amount controls the formed inorganic metal oxide wall thickness while maintaining the micelle pore diameter and pore size.

6. The design strategy of claim 5, wherein the micelle pore sizes created may range from mesopores to macropores.

7. The design strategy of claim 6, wherein micelle pore sizes range from 20 to 75 nm.

8. The method of claim 5, wherein at least one micelle is incorporated into a film.

9. The method of claim 1, adjusting the ratio between the inorganic metal oxide precursor to the structure directing agent (i.e. the block copolymer) changes the micelle-to-micelle distance but does not change nominal micelle size.

* * * * *